United States Patent
Tory et al.

(10) Patent No.: US 11,790,182 B2
(45) Date of Patent: *Oct. 17, 2023

(54) IDENTIFYING INTENT IN VISUAL ANALYTICAL CONVERSATIONS

(71) Applicant: Tableau Software, Inc., Seattle, WA (US)

(72) Inventors: Melanie K. Tory, Palo Alto, CA (US); Vidya R. Setlur, Portola Valley, CA (US)

(73) Assignee: Tableau Software, Inc., Seattle, WA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/152,762

(22) Filed: Jan. 19, 2021

(65) Prior Publication Data
US 2021/0256224 A1 Aug. 19, 2021

Related U.S. Application Data

(63) Continuation of application No. 16/219,406, filed on Dec. 13, 2018, now Pat. No. 10,896,297.
(Continued)

(51) Int. Cl.
*G06F 40/35* (2020.01)
*G06F 40/289* (2020.01)
(Continued)

(52) U.S. Cl.
CPC .......... *G06F 40/35* (2020.01); *G06F 16/3329* (2019.01); *G06F 40/00* (2020.01);
(Continued)

(58) Field of Classification Search
CPC ...... G06F 40/35; G06F 16/3329; G06F 40/00; G06F 40/20; G06F 40/289; G06F 40/30; G06F 40/40; G06F 3/0484
See application file for complete search history.

(56) References Cited

U.S. PATENT DOCUMENTS

| 4,800,810 A | 1/1989 | Masumoto |
| 5,036,314 A | 7/1991 | Barillari et al. |

(Continued)

FOREIGN PATENT DOCUMENTS

| HU | 215657 B | 1/1994 |
| WO | WO 2006/060773 A2 | 6/2006 |

OTHER PUBLICATIONS

Becker, Trellis Graphics Displays: A Multi-dimensional Data Visualization Tool for Data Mining, Aug. 1997, 13 pgs.
(Continued)

*Primary Examiner* — Linda Wong
(74) *Attorney, Agent, or Firm* — Morgan, Lewis & Bockius LLP

(57) ABSTRACT

A method uses natural language processing for visual analysis of a dataset by a computer. The computer displays a data visualization based on a dataset retrieved from a database. The computer computes an initial visualization state that includes elements corresponding to data attributes of the data visualization. The computer receives user input to specify a natural language command related to the displayed data visualization. The computer extracts cue phrases from the natural language command. The computer also determines a transitional goal, to transform the data visualization, based on the cue phrases. The computer derives an updated visualization state based on the transitional goal, by applying transitional rules to each element of the initial visualization state. The computer subsequently computes analytical functions associated with the visualization states, thereby creating functional phrases. The computer then updates the data visualization based on the functional phrases.

18 Claims, 23 Drawing Sheets

Related U.S. Application Data

(60) Provisional application No. 62/598,399, filed on Dec. 13, 2017.

(51) Int. Cl.
*G06F 16/332* (2019.01)
*G06F 40/20* (2020.01)
*G06F 40/30* (2020.01)
*G06F 40/40* (2020.01)
*G06F 40/00* (2020.01)
*G06F 3/0484* (2022.01)

(52) U.S. Cl.
CPC ............ *G06F 40/20* (2020.01); *G06F 40/289* (2020.01); *G06F 40/30* (2020.01); *G06F 40/40* (2020.01); *G06F 3/0484* (2013.01)

(56) References Cited

U.S. PATENT DOCUMENTS

| | | | |
|---|---|---|---|
| 5,060,980 A | 10/1991 | Johnson et al. | |
| 5,144,452 A | 9/1992 | Abuyama | |
| 5,169,713 A | 12/1992 | Kumurdjian | |
| 5,265,244 A | 11/1993 | Ghosh et al. | |
| 5,265,246 A | 11/1993 | Li et al. | |
| 5,377,348 A | 12/1994 | Lau et al. | |
| 5,383,029 A | 1/1995 | Kojima | |
| 5,560,007 A | 9/1996 | Thai | |
| 5,577,241 A | 11/1996 | Spencer | |
| 5,581,677 A | 12/1996 | Myers et al. | |
| 5,664,172 A | 9/1997 | Antoshenkov | |
| 5,664,182 A | 9/1997 | Nierenberg et al. | |
| 5,668,987 A | 9/1997 | Schneider | |
| 5,794,246 A | 8/1998 | Sankaran et al. | |
| 5,864,856 A | 1/1999 | Young | |
| 5,893,088 A | 4/1999 | Hendricks et al. | |
| 5,913,205 A | 6/1999 | Jain et al. | |
| 5,933,830 A | 8/1999 | Williams | |
| 6,031,632 A | 2/2000 | Yoshihara et al. | |
| 6,032,158 A | 2/2000 | Mukhopadhyay et al. | |
| 6,044,374 A | 3/2000 | Nesamoney et al. | |
| 6,100,901 A | 8/2000 | Mohda et al. | |
| 6,115,744 A | 9/2000 | Robins et al. | |
| 6,154,766 A | 11/2000 | Yost et al. | |
| 6,173,310 B1 | 1/2001 | Yost et al. | |
| 6,188,403 B1 | 2/2001 | Sacerdoti et al. | |
| 6,208,990 B1 | 3/2001 | Suresh et al. | |
| 6,222,540 B1 | 4/2001 | Sacerdoti et al. | |
| 6,247,008 B1 | 6/2001 | Cambot et al. | |
| 6,253,257 B1 | 6/2001 | Dundon | |
| 6,260,050 B1 | 7/2001 | Yost et al. | |
| 6,269,393 B1 | 7/2001 | Yost et al. | |
| 6,300,957 B1 | 10/2001 | Rao et al. | |
| 6,301,579 B1 | 10/2001 | Becker | |
| 6,317,750 B1 | 11/2001 | Tortolani et al. | |
| 6,327,628 B1 | 12/2001 | Anuff et al. | |
| 6,339,775 B1 | 1/2002 | Zamanian et al. | |
| 6,377,259 B2 | 4/2002 | Tenev et al. | |
| 6,397,195 B1 | 5/2002 | Pinard et al. | |
| 6,400,366 B1 | 6/2002 | Davies et al. | |
| 6,405,195 B1 | 6/2002 | Ahlberg | |
| 6,405,208 B1 | 6/2002 | Raghavan et al. | |
| 6,424,933 B1 | 7/2002 | Agrawala et al. | |
| 6,490,593 B2 | 12/2002 | Proctor | |
| 6,492,989 B1 | 12/2002 | Wilkinson | |
| 6,522,342 B1 | 2/2003 | Gagnon et al. | |
| 6,611,825 B1 | 8/2003 | Billheimer et al. | |
| 6,643,646 B2 | 11/2003 | Su et al. | |
| 6,707,454 B1 | 3/2004 | Barg et al. | |
| 6,714,897 B2 | 3/2004 | Whitney et al. | |
| 6,725,230 B2 | 4/2004 | Ruth et al. | |
| 6,750,864 B1 | 6/2004 | Anwar | |
| 6,768,986 B2 | 7/2004 | Cras et al. | |
| 6,906,717 B2 | 6/2005 | Couckuyt et al. | |
| 7,009,609 B2 | 3/2006 | Miyadai | |
| 7,023,453 B2 | 4/2006 | Wilkinson | |
| 7,089,266 B2 | 8/2006 | Stolte et al. | |
| 7,117,058 B2 | 10/2006 | Lin et al. | |
| 7,176,924 B2 | 2/2007 | Wilkinson | |
| 7,290,007 B2 | 10/2007 | Farber et al. | |
| 7,302,383 B2 | 11/2007 | Valles | |
| 7,315,305 B2 | 1/2008 | Crotty et al. | |
| 7,379,601 B2 | 5/2008 | Yang et al. | |
| 7,426,520 B2 | 9/2008 | Gorelik et al. | |
| 7,603,267 B2 | 10/2009 | Wang et al. | |
| 7,716,173 B2 | 5/2010 | Stolte et al. | |
| 7,882,144 B1 | 2/2011 | Stolte et al. | |
| 8,082,243 B2 | 12/2011 | Gorelik et al. | |
| 8,140,586 B2 | 3/2012 | Stolte et al. | |
| 8,176,440 B2 * | 5/2012 | Stading | G06F 16/26 715/853 |
| 8,442,999 B2 | 5/2013 | Gorelik et al. | |
| 8,473,521 B2 | 6/2013 | Fot et al. | |
| 8,620,937 B2 | 12/2013 | Jonas | |
| 8,713,072 B2 | 4/2014 | Stotle et al. | |
| 8,751,505 B2 | 6/2014 | Carmel et al. | |
| 8,874,613 B2 | 10/2014 | Gorelik et al. | |
| 8,972,457 B2 | 3/2015 | Stolte et al. | |
| 9,183,235 B2 | 11/2015 | Stolte et al. | |
| 9,299,173 B2 | 3/2016 | Rope et al. | |
| 9,336,253 B2 | 5/2016 | Gorelik et al. | |
| 9,501,585 B1 | 11/2016 | Gautam et al. | |
| 9,633,091 B2 | 4/2017 | Stolte et al. | |
| 9,665,662 B1 | 5/2017 | Gautam et al. | |
| 9,672,497 B1 | 6/2017 | Lewis | |
| 9,818,211 B1 | 11/2017 | Gibb et al. | |
| 9,858,292 B1 | 1/2018 | Setlur et al. | |
| 9,947,314 B2 | 4/2018 | Cao et al. | |
| 9,983,849 B2 | 5/2018 | Weingartner | |
| 10,042,517 B2 | 8/2018 | Stolte et al. | |
| 10,042,901 B2 | 8/2018 | Stolte et al. | |
| 10,095,217 B2 * | 10/2018 | Jacobs, II | G06F 30/00 |
| 10,331,720 B2 | 6/2019 | Neels et al. | |
| 10,409,551 B1 * | 9/2019 | Waugh | G10L 15/26 |
| 10,418,032 B1 | 9/2019 | Mohajer et al. | |
| 10,515,121 B1 | 12/2019 | Setlur et al. | |
| 10,546,001 B1 | 1/2020 | Nguyen et al. | |
| 10,546,003 B2 | 1/2020 | Gupta et al. | |
| 10,564,622 B1 | 2/2020 | Dean et al. | |
| 10,817,527 B1 | 10/2020 | Setlur et al. | |
| 10,956,655 B2 | 3/2021 | Choe | |
| 11,080,336 B2 | 8/2021 | Van Dusen | |
| 11,114,189 B2 | 9/2021 | Prosky et al. | |
| 2001/0013036 A1 | 8/2001 | Judicibus | |
| 2002/0002325 A1 | 1/2002 | Lliff | |
| 2002/0059204 A1 | 5/2002 | Harris | |
| 2002/0118192 A1 | 8/2002 | Couckuyt et al. | |
| 2002/0123865 A1 | 9/2002 | Whitney et al. | |
| 2002/0135610 A1 | 9/2002 | Ootani et al. | |
| 2002/0154118 A1 | 10/2002 | McCarthy et al. | |
| 2003/0200034 A1 | 10/2003 | Fellenberg et al. | |
| 2004/0148170 A1 | 7/2004 | Acero et al. | |
| 2004/0183800 A1 | 9/2004 | Peterson | |
| 2004/0227759 A1 | 11/2004 | McKnight et al. | |
| 2004/0243593 A1 | 12/2004 | Stolte et al. | |
| 2005/0035966 A1 | 2/2005 | Pasquarette et al. | |
| 2005/0035967 A1 | 2/2005 | Joffrain et al. | |
| 2005/0060300 A1 | 3/2005 | Stolte et al. | |
| 2005/0099423 A1 | 5/2005 | Brauss | |
| 2006/0129913 A1 | 6/2006 | Vigesaa et al. | |
| 2006/0136825 A1 | 6/2006 | Cory et al. | |
| 2006/0206512 A1 | 9/2006 | Hanrahan et al. | |
| 2007/0061344 A1 | 3/2007 | Dickerman et al. | |
| 2007/0061611 A1 | 3/2007 | MacKinlay et al. | |
| 2007/0129936 A1 | 6/2007 | Wang et al. | |
| 2008/0016026 A1 | 1/2008 | Farber et al. | |
| 2009/0313576 A1 | 12/2009 | Neumann et al. | |
| 2011/0112837 A1 | 5/2011 | Kurki-Sounio et al. | |
| 2011/0119047 A1 | 5/2011 | Ylonen | |
| 2011/0184718 A1 | 7/2011 | Chen | |
| 2012/0323948 A1 | 12/2012 | Li et al. | |
| 2013/0249917 A1 | 9/2013 | Fanning et al. | |
| 2014/0164362 A1 | 6/2014 | Syed et al. | |
| 2014/0236579 A1 | 8/2014 | Kurz | |

(56) References Cited

U.S. PATENT DOCUMENTS

| | | |
|---|---|---|
| 2016/0078354 A1 | 3/2016 | Petri et al. |
| 2016/0092090 A1 | 3/2016 | Stojanovic et al. |
| 2016/0171050 A1 | 6/2016 | Das |
| 2016/0179908 A1* | 6/2016 | Johnston ............. G06F 3/04847 707/724 |
| 2017/0011023 A1 | 1/2017 | Ghannam et al. |
| 2017/0091277 A1 | 3/2017 | Zoch |
| 2017/0091902 A1 | 3/2017 | Bostik et al. |
| 2017/0118308 A1 | 4/2017 | Vigeant |
| 2017/0154089 A1 | 6/2017 | Sherman |
| 2017/0308571 A1 | 10/2017 | McCurley |
| 2018/0032576 A1 | 2/2018 | Romero |
| 2018/0033203 A1* | 2/2018 | Ligameri ............. G06F 3/1454 |
| 2018/0039614 A1 | 2/2018 | Govindarajulu et al. |
| 2018/0144065 A1 | 5/2018 | Yellai |
| 2018/0158245 A1 | 6/2018 | Govindan |
| 2018/0203924 A1 | 7/2018 | Agrawal et al. |
| 2018/0210883 A1 | 7/2018 | Ang |
| 2018/0329987 A1 | 11/2018 | Tata et al. |
| 2019/0042634 A1 | 2/2019 | Stolte et al. |
| 2019/0102390 A1 | 4/2019 | Antunes et al. |
| 2019/0108171 A1 | 4/2019 | Stolte et al. |
| 2019/0115016 A1 | 4/2019 | Seok et al. |
| 2019/0120649 A1 | 4/2019 | Seok et al. |
| 2019/0121801 A1 | 4/2019 | Jethwa et al. |
| 2019/0138648 A1 | 5/2019 | Gupta et al. |
| 2019/0163807 A1 | 5/2019 | Jain et al. |
| 2019/0179607 A1 | 6/2019 | Thangarathnam et al. |
| 2019/0197605 A1 | 6/2019 | Sadler et al. |
| 2019/0236144 A1 | 8/2019 | Hou et al. |
| 2019/0272296 A1 | 9/2019 | Prakash et al. |
| 2019/0311717 A1 | 10/2019 | Kim et al. |
| 2019/0349321 A1 | 11/2019 | Cai et al. |
| 2019/0384815 A1 | 12/2019 | Patel et al. |
| 2020/0065385 A1 | 2/2020 | Dreher et al. |
| 2020/0089700 A1 | 3/2020 | Ericson et al. |
| 2020/0089760 A1 | 3/2020 | Ericson et al. |
| 2020/0090189 A1 | 3/2020 | Tutuk et al. |
| 2020/0104402 A1 | 4/2020 | Burnett et al. |
| 2020/0110803 A1 | 4/2020 | Djalali et al. |
| 2020/0134103 A1 | 4/2020 | Mankovskii |
| 2020/0327432 A1 | 10/2020 | Doebelin et al. |

OTHER PUBLICATIONS

Becker, Visualizing Decision Table Classifiers, 1998, 4 pgs.
Beers, Office Action, U.S. Appl. No. 11/787,761, dated Jun. 12, 2008, 12 pgs.
Beers, Office Action, U.S. Appl. No. 11/787,761, dated Dec. 17, 2008, 13 pgs.
Bosch, Performance Analysis and Visualization of Parallel Systems Using SimOS and Rivet: A Case Study , Jan. 2000, 13 pgs.
Bosch, Rivet: A Flexible Environment for Computer Systems Visualization, Feb. 2000, 9 pgs.
Brunk, MineSet: An Integrated System for Data Mining, 1997, 4 pgs.
D. Brookshire Conner et al., "Three-Dimensional Widgets," 1992 ACM, pp. 183-231, (Year: 1992).
Derthick, An Interactive Visual Query Environment for Exploring Data, 1997, 11 pgs.
Freeze, Unlocking OLAP with Microsoft SQL Server and Excel 2000, 2000, 220 pgs.
Fua, "Hierarchical Parallel Coordinates for Exploration of Large Datasets," IEEE 1999, pp. 43-50 (Year: 1999).
Eser Kandogan, "Star Coordinates: A Multi-dimensional Visualization Technique with Uniform Treatment of Dimensions," www.citeseerx.st.psu.edu, pp. 1-4, 2000 (YearL 2000).
Fua, Navigating Hierarchies with Structure-Based Brushes, 1999, 7 pgs.
Gao, Tong, et al. "Datatone: Managing ambiguity in natural language interfaces for data visualization." Proceedings of the 28th Annual ACM Symposium on User Interface Software & Technology, Nov. 2015, pp. 489-500, (Year: 2015).
Goldstein, A Framework for Knowledge-Based Interactive Data Exploration, Dec. 1994, 30 pgs.
Gray, Data Cube: A Relational Aggregation Operator Generalizing Group-By, 1997, 24 pgs.
Hanrahan, Office Action, U.S. Appl. No. 11/005,652, dated Feb. 20, 2009, 11 pgs.
Hanrahan, Office Action, U.S. Appl. No. 11/005,652, dated Jul. 24, 2008, 11 pgs.
Hanrahan, Office Action, U.S. Appl. No. 11/005,652, dated Dec. 27, 2007, 11 pgs.
Hanrahan, Specification, U.S. Appl. No. 11/005,652, Dec. 2, 2004, 104 pgs.
Harri Siirtola, "Direct Manipulation of Parallel Coordinates," 2000 IEEE, pp. 373-378, (Year: 2000).
Healey, On the Use of Perceptual Cues and Data Mining for Effective Visualization of Scientific Datasets, 1998, 8 pgs.
Hearst, Office Action, U.S. Appl. No. 16/601,413, dated Nov. 3, 2020, 17 pgs.
Hearst, Notice of Allowance, U.S. Appl. No. 16/601,413, dated Mar. 3, 2021, 10 pgs.
Hearst, Notice of Allowance, U.S. Appl. No. 17/347,453, dated Apr. 6, 2022, 11 pgs.
Hing-Yan Lee et al., "A Multi-Dimensional Data Visualization Tool for Knowledge Discovery in Databases," 1995 IEEE, pp. 26-31, (Year: 1995).
HU Search Report, HU P0700460, dated Oct. 9, 2007, 1 pg.
John V. Carlis and Joseph A. Konstan, Interactive Visulaization of Serial Periodic Data, www.Courses.ischool.berkeley.edu, pp. 1-10, 1998 (Year: 1998).
Joseph, Office Action, U.S. Appl. No. 13/734,694, dated Aug. 18, 2014, 46 pgs.
Keim, VisDB: Dattabase Exploration Using Multidimensional Visualization, Aug. 1994, 27 pgs.
Kohavi, Data Mining and Visualization, 2000, 8 pgs.
Livney, M. et al., "DEVise: Integraed Querying and Visual Exploration of Large Datasets," ACM, 1997, pp. 301-312, (Year: 1997).
MacDonald, Creating Basic Charts, 2006, 46 pgs.
MacKinlay, Automating the Design of Graphical Presentations of Relational Information, 1986, 34 pgs.
MacKinlay, Office Action, U.S. Appl. No. 11/223,658, dated May 21, 2008, 20 pgs.
MacKinlay, Office Action, U.S. Appl. No. 11/223,658, dated Feb. 23, 2009, 19 pgs.
MacKinlay, Specification, U.S. Appl. No. 11/223,658, dated Sep. 9, 2005, 58 pgs.
Matsushita, Mitsunori, Eisaku Maeda, and Tsuneaki Kato. "An interactive visualization method of numerical data based on natural language requirements." International journal of human-computer studies 60.4, Apr. 2004, pp. 469-488, (Year: 2004).
Perlin, An Alternative Approach to the Computer Interface, 1993, 11 pgs.
Popescu, et al. "Towards a theory of natural language interfaces to databases." Proceedings of the 8th international conference on Intelligent user interfaces. Jan. 2003, pp. 149-157. (Year: 2003).
Rao, The Table Lens: Merging Graphical and Symbolic Representation in an Interactive Focus+Context Visualization for Tabular Information, Apr. 1994, 7 pgs.
Roth, Interactive Graphic Design Using Automatic Presentation Knowledge, 24—Apr. 28, 1994, 7 pgs.
Roth, Visage: A User Interface Environment for Exploring Information, Oct. 28-29, 2006, 9 pgs.
Screen Dumps for Microsoft Office Excel 2003 SP2, figures 1-36, 2003, pp. 1-19.
Setlur, Preinterview First Office Action, U.S. Appl. No. 16/234,470, dated Sep. 24, 2020, 6 pgs.
Setlur, First Action Interview Office Action, U.S. Appl. No. 16/234,470, dated Oct. 28, 2020, 4 pgs.
Setlur, Final Office Action, U.S. Appl. No. 16/234,470, dated Jun. 2, 2021, 49 pgs.
Setlur, Notice of Allowance, U.S. Appl. No. 16/234,470, dated Nov. 10, 2021, 14 pgs.

(56) References Cited

OTHER PUBLICATIONS

Spenke, Focus: The Interactive Table for Product Comparison and Selection, Nov. 1996, 10 pgs.
Stevens, On the Theory of Scales of Measurement, Jun. 7, 1946, 4 pgs.
Stephen G. Eick, "Visualizing Multi-Dimensional Data," Visual Insights, Inc., Feb. 2000, ACM SIGGRAPH computer graphics, ACM, pp. 1-7, (Year: 2000).
Stolte, Multiscale Visualization Using Data Cubes, 2002, 8 pgs.
Stolte, Notice of Allowance, U.S. Appl. No. 10/453,834, dated Mar. 27, 2006, 9 pgs.
Stolte, Notice of Allowance, U.S. Appl. No. 11/488,407, dated Dec. 29, 1999, 8 pgs.
Stolte, Notice of Allowance, U.S. Appl. No. 13/019,227, dated Nov. 10, 2011, 8 pgs.
Stolte, Notice of Allowance, U.S. Appl. No. 13/425,300, dated Dec. 10, 2013, 10 pgs.
Stolte, Office Action, U.S. Appl. No. 10/667,194, dated Jan. 7, 2008, 10 pgs.
Stolte, Office Action, U.S. Appl. No. 10/667,194, dated Feb. 9, 2009, 11 pgs.
Stolte, Office Action, U.S. Appl. No. 10/667,194, dated Aug. 14, 2007, 16 pgs.
Stolte, Office Action, U.S. Appl. No. 10/667,194, dated Aug. 14, 2008, 10 pgs.
Stolte, Office Action, U.S. Appl. No. 10/667,194, dated Jan. 18, 2007, 15 pgs.
Stolte, Office Action, U.S. Appl. No. 10/667,194, dated Jun. 26, 2006, 13 pgs.
Stolte, Office Action, U.S. Appl. No. 11/488,407, dated Apr. 3, 2009, 6 pgs.
Stolte, Office Action, U.S. Appl. No. 13/019,227, dated Apr. 18, 2011, 9 pgs.
Stolte, Office Action, U.S. Appl. No. 13/425,300, dated Mar. 15, 2013, 7 pgs.
Stolte, Office Action, U.S. Appl. No. 14/937,836, dated Oct. 7, 2016, 10 pgs.
Stolte, Notice of Allowance, U.S. Appl. No. 14/937,836, dated Mar. 1, 2017, 8 pgs.
Stolte, Office Action, U.S. Appl. No. 15/449,844, dated Jun. 29, 2017, 16 pgs.
Stolte, Final Office Action, U.S. Appl. No. 15/449,844, dated Feb. 6, 2018, 8 pgs.
Stolte, Notice of Allowance, U.S. Appl. No. 15/449,844, dated May 18, 2018, 9 pgs.
Stolte, Office Action, U.S. Appl. No. 15/582,478, dated Jul. 11, 2017, 16 pgs.
Stolte, Final Office Action, U.S. Appl. No. 15/582,478, dated Mar. 8, 2018, 10 pgs.
Stolte, Notice of Allowance U.S. Appl. No. 15/582,478, dated Jun. 26, 2017, 10 pgs.
Stolte, Notice of Allowance U.S. Appl. No. 16/056,396, dated Apr. 16, 2019, 10 pgs.
Stolte, Office Action, U.S. Appl. No. 16/056,819, dated Aug. 7, 2019, 12 pgs.
Stolte, Notice of Allowance, U.S. Appl. No. 16/056,819, dated Sep. 11, 2019, 8 pgs.
Stolte Notice of Allowance, U.S. Appl. No. 16/221,407, dated Aug. 22, 2022, 10 pgs.
Stolte Notice of Allowance, U.S. Appl. No. 16/283,700, dated Aug. 22, 2022, 11 pgs.
Stolte Office Action, U.S. Appl. No. 16/220,240, dated Aug. 7, 2019, 11 pgs.
Stolte, Notice of Allowance, U.S. Appl. No. 16/220,240, dated Sep. 11, 2019, 8 pgs.
Stolte Notice of Allowance, U.S. Appl. No. 16/137,457, dated Sep. 6, 2019, 10 pgs.
Stolte Notice of Allowance, U.S. Appl. No. 16/137,071, dated Sep. 11, 2019, 10 pgs.
Stolte, Polaris: A System for Query, Analysis, and Visualization of Multidimensional Relational Databases, Jan. 2002, 14 pgs.
Stolte, Query Analysis, and Visualization of Hierarchically Structured Data Using Polaris, Jul. 2002, 11 pgs.
Stolte, Specification, U.S. Appl. No. 10/453,834, Jun. 2, 2003, 114 pgs.
Stolte, Visualizing Application Behavior on Superscaler Processors, 1999, 9 pgs.
Tableau Software, IPRP, PCT/US2005/043937, Jun. 5, 2007, 9 pgs.
Tableau Software, IPRP, PCT/US2007/009810, Oct. 22, 2008, 7 pgs.
Tableau Software, ISR/WO, PCT/US2005/043937, Apr. 18, 2007, 9 pgs.
Tableau Software, ISR/WO, PCT/US2006/35300, Jul. 7, 2008, 6 pgs.
Tableau Software, ISR/WO, PCT/US2007/009810, Jul. 7, 2008, 8 pgs.
Tableau Software, Inc., International Search Report and Written Opinion, PCT/US2019/055169, dated Dec. 16, 2019, 12 pgs.
The Board of Trustees . . . Stanford, IPRP, PCT/US04/18217, Oct. 19, 2006, 4 pgs.
The Board of Trustees . . . Stanford, IPRP, PCT/US2004/30396, Jan. 30, 2007, 3 pgs.
The Board of Trustees . . . Stanford, ISR/WO, PCT/US04/18217, Feb. 7, 2006, 6 pgs.
The Board of Trustees . . . Stanford, ISR/WO, PCT/US2004/30396, Aug. 24, 2006, 5 pgs.
The Board of Trustees . . . Stanford, Supplementary ESR, EP 04754739.3, Dec. 17, 2007, 4 pgs.
Thearling, Visualizing Data Mining Models, 2001, 14 pgs.
Tory, First Action Preinterview Office Action, U.S. Appl. No. 16/219,406, dated Jul. 10, 2020, 7 pgs.
Tory, Notice of Allowance U.S. Appl. No. 16/219,406, dated Sep. 9, 2020, 8 pgs.
Tory, Office Action, U.S. Appl. No. 16/575,354, dated Nov. 3, 2020, 17 pgs.
Tory, Office Action, U.S. Appl. No. 16/575,354, dated Sep. 20, 2021, 21 pgs.
Tory, Notice of Allowance, U.S. Appl. No. 16/575,354, dated Jan. 12, 2022, 9 pgs.
Tory, Office Action, U.S. Appl. No. 16/575,349, dated Oct. 13, 2020, 15 pgs.
Tory, Notice of Allowance, U.S. Appl. No. 16/575,349, dated Feb. 3, 2021, 9 pgs.
Ward, XmdvTool: Integrating Multiple Methods for Visualizing Multi-Variate Data, 9 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.
Wilkinson, Statistics and Computing—The Grammar of Graphics, 1999, 417 pgs.

* cited by examiner

|  | No Context | With Context |
|---|---|---|
| *Elaborate* | Repeat/ rephrase with additions | Full phrase: repeat/rephrase with additions<br><br>Incomplete uttr with: anaphoric reference, new items, and/or 'add'/'include' |
| *Adjust/Pivot* | Repeat/rephrase with substitutions/ deletions | Full phrase: repeat/rephrase with substitutions/deletions<br><br>Incomplete uttr with: anaphoric reference, explicit encoding shift, value shift, and/or 'instead of' |
| *Undo* | Repeat uttr that generated desired state | 'Undo', 'Remove' |
| *Start New* | Minimal overlap with prior uttr | Explicit reset Full phrase; minimal overlap with prior state |
| *Retry* | Rephrase (synonyms or grammar) Increase specificity | |

Figure 5A

|  | Explicit | Implicit |
|---|---|---|
| *Attributes* | Attribute names, values | No measure implies NumberOfRecords |
| *Transforms* | Keywords like 'bin', 'rate' | Phrasing ('survival' may imply %survived) |
| *Filters* | Attribute names, values, filter keywords like 'only' | Small cardinality attributes: show named item in context |
| *Encodings* | Chart types ('scatterplot'), visual variables ('color by') | Data Targets ('correlation'), Actions ('compare') |

Figure 5B

| Intent | Visualization Results | |
|---|---|---|
| Categorical Data Analysis | "Show Medals by Gender and Discipline" 622<br><br>"Compare Men and Women for Aquatics" 626<br>Gender Encoded on Color — 628 | "Model with Highest City mpg" 630<br>Sorting and Highlighting Applied — 632 |

624 — Compact Representation for Comparison

Figure 6C

| Intent | Visualization Results |
|---|---|
| Transitions with no Intent on Encoding | "Child Mortality Rate Over Time" Date — Initial Utterance — 634, 636<br><br>"By Sex and Age Group" Age Group / Date — Sex Encoded on Color — 638, 640<br><br>"By Sex and Country" Country Name / Date — Contry Swapped with Age Group — 642, 644 |

Figure 6D

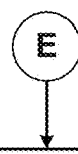

744 — The one or more transitional rules comprise a RETAIN rule for retaining each visualization state in the first set of one or more visualization states in the second set of one or more visualization states without adding any visualization state from the temporary set of one or more visualization states to the second set of one or more visualization states.

Figure 7E

746 — The one or more transitional rules comprise a SHIFT rule for including each visualization state in the first set of one or more visualization states in the second set of one or more visualization states and replacing one or more visualization states in the second set of one or more visualization states with visualization states in the temporary set of one or more visualization states.

Figure 7F

748 — The one or more transitional rules comprise a RESET rule for resetting each of the first set of one or more visualization states, the temporary set of one or more visualization states, and the second set of one or more visualization states to an empty set that includes no visualization states.

Figure 7G

IDENTIFYING INTENT IN VISUAL ANALYTICAL CONVERSATIONS

RELATED APPLICATIONS

This application is a continuation of U.S. application Ser. No. 16/219,406, filed Dec. 13, 2018, entitled "Identifying Intent in Visual Analytical Conversations," which is incorporated by reference herein in its entirety.

This application is related to U.S. patent application Ser. No. 15/804,991, filed Nov. 6, 2017, entitled "Systems and Methods of Using Natural Language Processing for Visual Analysis of a Data Set," U.S. patent application Ser. No. 15/486,265, filed Apr. 12, 2017, entitled "Systems and Methods of Using Natural Language Processing for Visual Analysis of a Data Set," U.S. Provisional Application Ser. No. 62/321,695, filed Apr. 12, 2016, entitled "Using Natural Language Processing for Visual Analysis of a Data Set," U.S. Provisional Application Ser. No. 62/418,052, filed Nov. 4, 2016, entitled "Using Natural Language Processing for Visual Analysis of a Data Set," and U.S. Provisional Application Ser. No. 62/500,999, filed May 3, 2017, entitled "Applying Pragmatics Principles for Interaction with Visual Analytics," each of which is incorporated by reference herein in its entirety. This application is also related to U.S. Pat. No. 9,183,235, filed Mar. 3, 2015, which is incorporated by reference herein in its entirety.

TECHNICAL FIELD

The disclosed implementations relate generally to data visualization and more specifically to systems, methods, and user interfaces that enable users to interact with and explore datasets using a natural language interface.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. Most systems return only very basic interactive visualizations in response to queries, and others require expert modeling to create effective queries. Other systems require simple closed-ended questions, and then are only capable of returning a single text answer or a static visualization.

Natural language has garnered interest as a useful modality for creating and interacting with visualizations. Natural language interaction techniques offer the promise of easy, intuitive engagement with data even for non-experts by enabling users to express their analytical goals as natural language utterances. Natural language interaction is effective when it supports questions pertaining to a user's information needs. In this respect, however, many natural language interfaces fail to accurately determine a user's information needs in many cases.

SUMMARY

To effectively support visual analytical workflows, it is critical to accurately infer the user's intent. However, existing natural language interfaces either do not infer intent, infer very limited aspects of intent, rely on explicitly named data attributes, values, and chart types, or restrict relevance of the automatically generated visualization responses.

Accordingly, there is a need for tools that infer user intent to produce more useful visualizations. There is also a need for tools that employ intent to allow users to effectively utilize functionality provided by data visualization applications. One solution to the problem is providing a natural language interface as part of a data visualization application (e.g., within the user interface for the data visualization application) for an interactive query dialog that provides graphical answers to natural language queries. The natural language interface uses both context and intent to support analytical flow in conversations. The natural language interface models transitions in visual analytical conversations by characterizing users' transitional goals. The model supported by the natural language interface combines concepts from visualization reference models (used to describe visualization pipelines) with concepts from centering theory (used to describe conversational transitions). The natural language interface uses cue words or phrases in natural language utterances to deduce intended visualization states and transitions, and supports an automatic approach for identifying breaks between conversational segments.

In accordance with some implementations, a method executes at an electronic device with a display, one or more processors, and memory. For example, the electronic device can be a smart phone, a tablet, a notebook computer, or a desktop computer. The device displays a data visualization based on a dataset retrieved from a database using a first set of one or more database queries. A user specifies a natural language command related to the displayed data visualization. Based on the displayed data visualization, the device extracts a first set of one or more cue phrases from the natural language command. The device then computes a first analytical intent based on the first set of one or more cue phrases. The device then derives a first set of one or more visualization states based on the first analytical intent. The device then computes a set of analytical functions associated with the first set of one or more visualization states, thereby creating a set of one or more functional phrases. The device then updates the data visualization based on the set of one or more functional phrases.

In some implementations, the device obtains a second set of one or more visualization states associated with the data visualization before updating the data visualization. The device extracts a set of one or more independent analytic phrases from the natural language command, and computes a temporary set of one or more visualization states associated with the natural language command based on the set of one or more analytic phrases. The device then computes one or more transitional goals associated with the natural language command based on the second set of one or more analytic phrases. Subsequently, the device computes one or more transitional rules corresponding to the one or more transitional goals, and derives the first set of one or more visualization states from the second set of one or more visualization states and the temporary set of one or more visualization states based on the one or more transitional rules.

In some implementations, the one or more transitional goals comprises elaboration, retrying, adjustment, undoing, or starting anew. In some implementations, the device computes the one or more transitional goals associated with the second analytical intent by extracting a second set of one or more cue phrases from the natural language command, computing a second analytical intent based on the second set of one or more cue phrases, and computing the one or more transitional goals based on the second analytical intent.

In some implementations, the device determines whether the second set of one or more cue phrases contains terms that signify elaboration (e.g., including the terms "repeat" or "rephrase" and the phrase "with additions," an incomplete utterance with either an anaphoric reference, the phrase "new items," and/or the terms "add" or "include"). In accordance with a determination that the second set of one or more cue phrases contains terms that signify elaboration, the device computes the second analytical intent to elaborate. In some implementations, the device determines whether the second set of one or more cue phrases contains terms that signify adjust/pivot, such as the terms "repeat" or "rephrase" and the phrase "with substitutions/deletions," an incomplete utterance with either an anaphoric reference, explicit encoding shift, value shift, and/or the term "instead of." In accordance with a determination that the second set of one or more cue phrases contains terms that signify adjust/pivot, the device computes the second analytical intent to adjust/pivot.

In some implementations, the device determines whether the second set of one or more cue phrases contains terms that signify undoing (e.g., including the terms "undo" or "remove," or a repetition of the utterance that generated a desired state). In accordance with a determination that the second set of one or more cue phrases contains terms that signify undoing, the device computes the second analytical intent to undo. In some implementations, the device determines whether the second set of one or more cue phrases contains terms that signify starting anew, such as when the second set of one or more cue phrases has minimal overlap with prior utterance, or corresponds to an explicit reset. In accordance with a determination that the second set of one or more cue phrases contains terms that signify starting anew, the device computes the second analytical intent to start anew. In some implementations, the device determines whether the second set of one or more cue phrases contains terms that signify retry, such as rephrasing an earlier utterance with synonyms or a change of grammar, or by the use of terms that increase specificity of an earlier utterance. In accordance with a determination that the second set of one or more cue phrases contains terms that signify retry, the device computes the second analytical intent to retry.

In some implementations, the one or more transitional rules comprise a CONTINUE rule for including each visualization state from the first set of one or more visualization states in the second set of one or more visualization states and adding one or more visualization states from the temporary set of one or more visualization states to the second set of one or more visualization states. In some implementations, the one or more transitional rules comprise a RETAIN rule for retaining each visualization state from the first set of one or more visualization states in the second set of one or more visualization states without adding any visualization state from the temporary set of one or more visualization states to the second set of one or more visualization states. In some implementations, the one or more transitional rules comprise a SHIFT rule for including each visualization state from the first set of one or more visualization states in the second set of one or more visualization states and replacing one or more visualization states from the second set of one or more visualization states with visualization states in the temporary set of one or more visualization states. In some implementations, the one or more transitional rules comprise a RESET rule for resetting each of the first set of one or more visualization states, the temporary set of one or more visualization states, and the second set of one or more visualization states to an empty set that includes no visualization states.

In some implementations, the first set of one or more visualization states comprises a data attribute, a transformation, a filter, or a visual encoding of a data attribute. In some implementations, the device determines whether the first set of one or more cue phrases contains a name attribute, a value, a term of measure, or a term of aggregation. In accordance with a determination that the first set of one or more cue phrases contains a name attribute or a value, but neither a term of measure nor a term of aggregation, the device computes the first analytical intent to be the number of records corresponding to the name attribute or the value. In some implementations, the device determines whether a data attribute is a categorical attribute having a number of distinct categories less than a threshold value (e.g., 5). In accordance with a determination that the data attribute is a categorical attribute with the number of categories less than the threshold value, the device computes the first analytical intent to be comparison of the categories.

In some implementations, the first set of one or more visualization states comprises a data attribute, a transformation, a filter, or a visual encoding using a data attribute. In some implementations, the device determines whether the first set of one or more cue phrases contains a term corresponding to a transformation. In accordance with a determination that the first set of one or more cue phrases contains a term corresponding to a transformation, the device computes the first analytical intent to be either grouping or binning of a continuous variable, or computing a derived calculation. In some implementations, the device determines whether the first set of one or more cue phrases contains a term corresponding to a chart type, a named visual variable, or a reason for a specific type of visual encoding. In accordance with a determination that the first set of one or more cue phrases contains a term corresponding to a chart type, the device computes the first analytical intent to select the chart type. In accordance with a determination that the first set of one or more cue phrases contains a term corresponding to a named visual variable, the device computes the first analytical intent to specify encoding for the visual variable according to the one or more cue phrases. In accordance with a determination that the first set of one or more cue phrases contains a reason for a specific type of visual encoding, the device computes the first analytical intent to select a corresponding visual encoding.

Typically, an electronic device includes one or more processors, memory, a display, and one or more programs stored in the memory. The programs are configured for execution by the one or more processors and are configured to perform any of the methods described herein. The one or more programs include instructions for displaying a data visualization based on a first dataset retrieved from a database using a first set of one or more queries. The one or more programs also include instructions for receiving a user input to specify a natural language command related to the data visualization. The one or more programs also include instructions for extracting a first set of one or more cue phrases from the natural language command. The one or more programs also include instructions for computing a first analytical intent based on the first set of one or more cue phrases. The one or more programs also include instructions for deriving a first set of one or more visualization states based on the visualization intent, computing a set of one or more analytical functions associated with the first set of one or more visualization states, thereby creating a set of one or more functional phrases, and updating the data visualization based on the set of one or more functional phrases.

In some implementations, a non-transitory computer readable storage medium stores one or more programs configured for execution by a computing device having one or more processors, memory, and a display. The one or more programs are configured to perform any of the methods described herein. The one or more programs include instructions for displaying a data visualization based on a first dataset retrieved from a database using a first set of one or more queries. The one or more programs also include instructions for receiving a user input to specify a natural language command related to the data visualization. The one or more programs also include instructions for extracting a first set of one or more cue phrases from the natural language command. The one or more programs also include instructions for computing a first analytical intent based on the first set of one or more cue phrases. The one or more programs also include instructions for deriving a first set of one or more visualization states based on the visualization intent, computing a set of one or more analytical functions associated with the first set of one or more visualization states, thereby creating a set of one or more functional phrases, and updating the data visualization based on the set of one or more functional phrases.

Thus methods, systems, and graphical user interfaces are disclosed that allow users to efficiently explore data displayed within a data visualization application by using natural language commands.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 5A provides examples of cues suggesting intended transitions, according to some implementations.

FIG. 5B provides examples of cue words used to infer intent around visualization states, according to some implementations.

FIGS. 6A-6F provide examples of how identified actions and targets are translated into suitable data visualizations, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
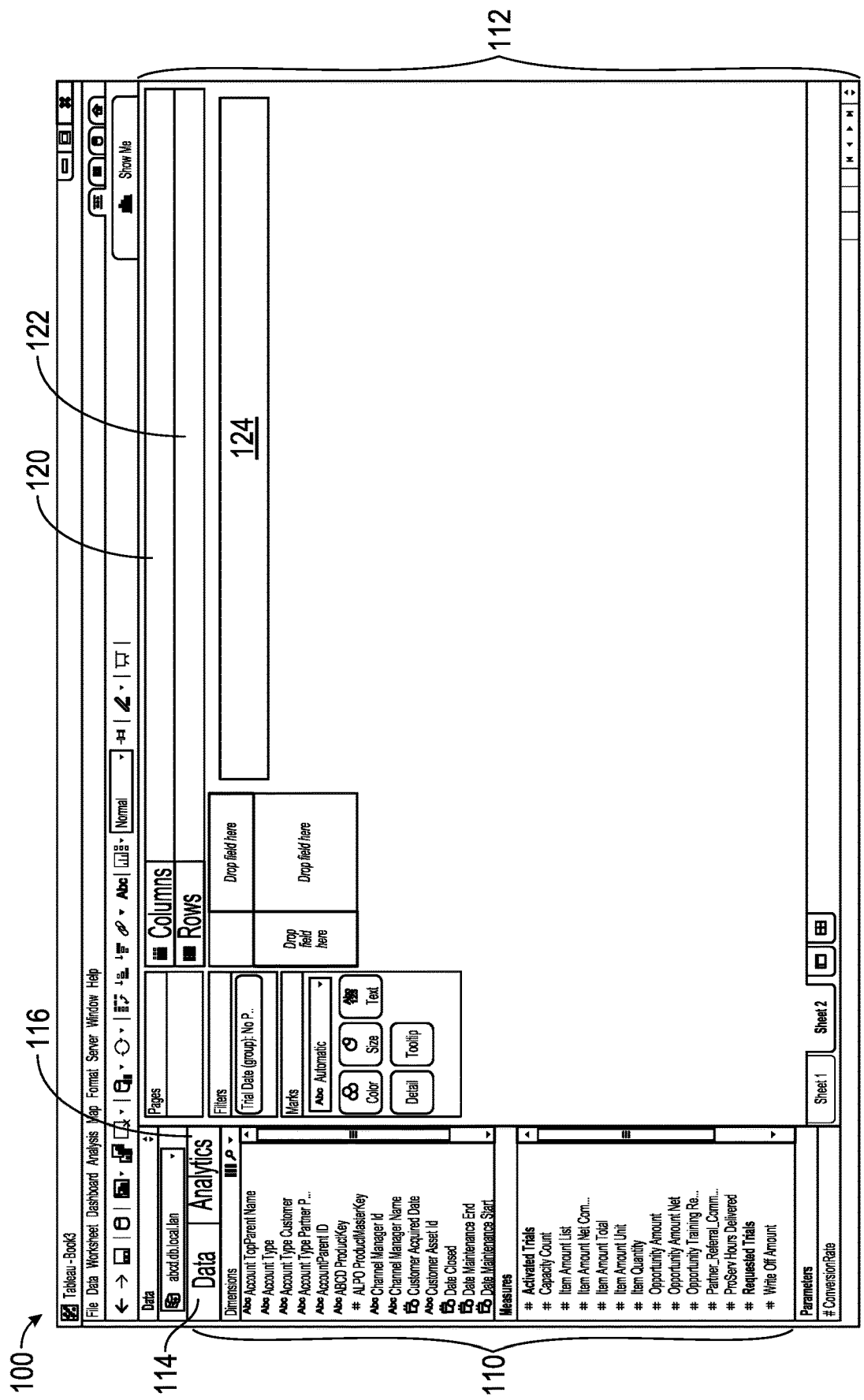
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets.

In some implementations, the graphical user interface 100 also includes a natural language processing region 124. The natural language processing region 124 includes an input bar (also referred to herein as a command bar) for receiving natural language commands. A user may interact with the input bar to provide commands. For example, the user may type a command in the input bar to provide the command. In addition, the user may indirectly interact with the input bar by speaking into a microphone (e.g., an audio input device 220) to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language processing region 124) to further explore the displayed data visualization. In some instances, a user creates the initial association using the natural language processing region 124, which results in one or more data elements being placed in the column shelf 120 and the row shelf 122. For example, the user may provide a command to create a relationship between data element X and data element Y. In response to receiving the command, the column shelf 120 and the row shelf 122 may be populated with the data elements (e.g., the column shelf 120 may be populated with data element X and the row shelf 122 may be populated with data element Y, or vice versa).

Figure 2:
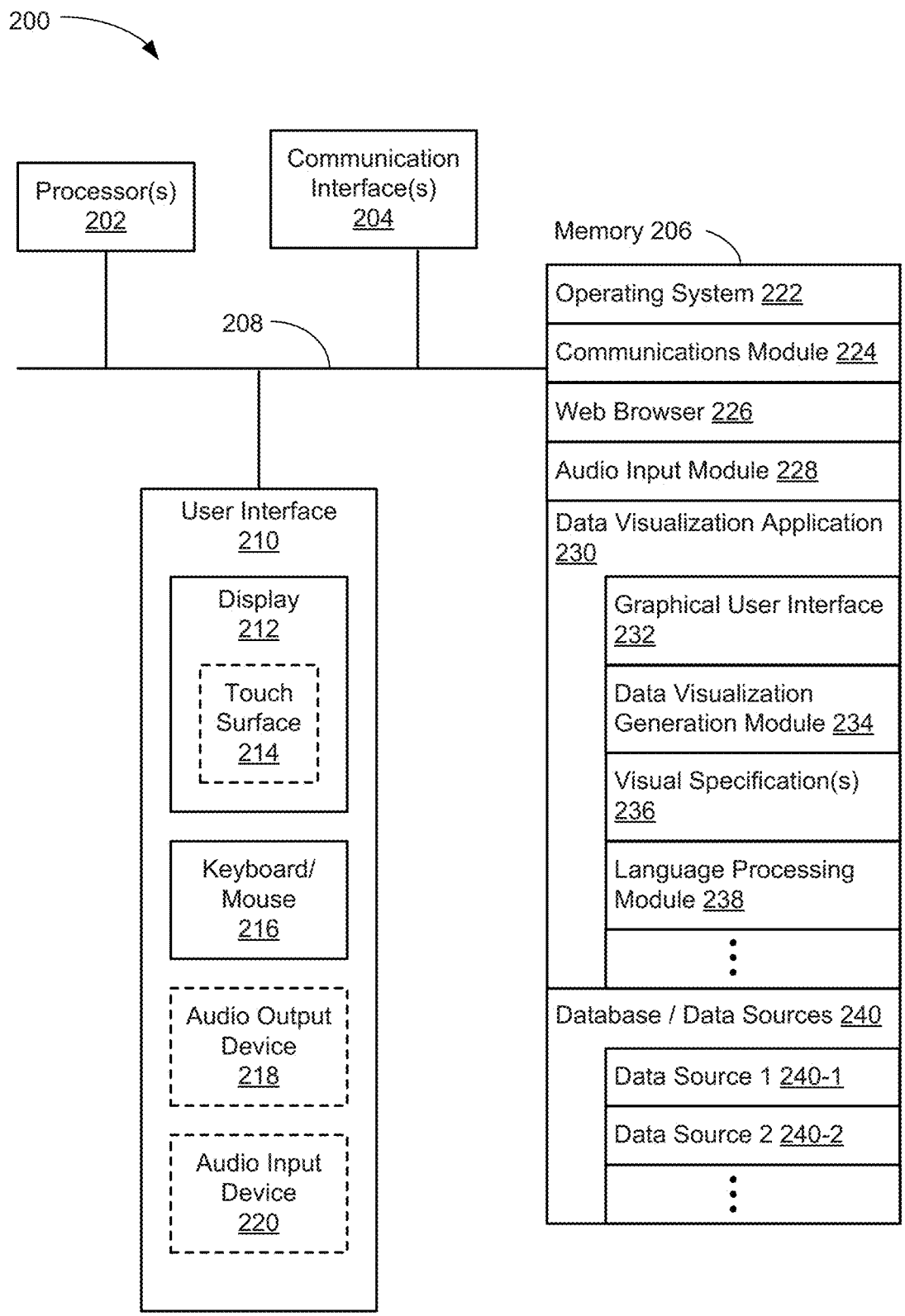
FIG. 2 is a block diagram of a computing device according to some implementations.

FIG. 2 is a block diagram illustrating a computing device 200, which can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 200 and voice recognition software to supplement or replace the keyboard. In some implementations, the computing device 200 includes an audio input device 220 (e.g., a microphone) to capture audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternately the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The application 230 includes a graphical user interface 232 (e.g., the graphical user interface 100 illustrated in FIG. 1) for a user to construct visual graphics. For example, a user selects one or more data sources 240 (which may be stored on the computing device 200 or stored remotely), selects data fields from the data source(s), and uses the selected fields to define a visual graphic; and
- zero or more databases or data sources 240 (e.g., a first data source 240-1 and a second data source 240-2), which are used by the data visualization application 230. In some implementations, the data sources are stored as spreadsheet files, CSV files, text files, JSON files, XML, files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the user interface 232. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236. In some implementations, the visual specification 236 includes previous natural language commands received from a user or properties specified by the user through natural language commands.

In some implementations, the data visualization application 230 includes a language processing module 238 for processing (e.g., interpreting) commands provided by a user of the computing device. In some implementations, the commands are natural language commands (e.g., captured by the audio input device 220). In some implementations, the language processing module 238 includes sub-modules, such as an intent deduction module, the operations of which are discussed in detail below in reference to FIGS. 3, 4A,4B, 4C, 5A, 5B, and 6A-6F.

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
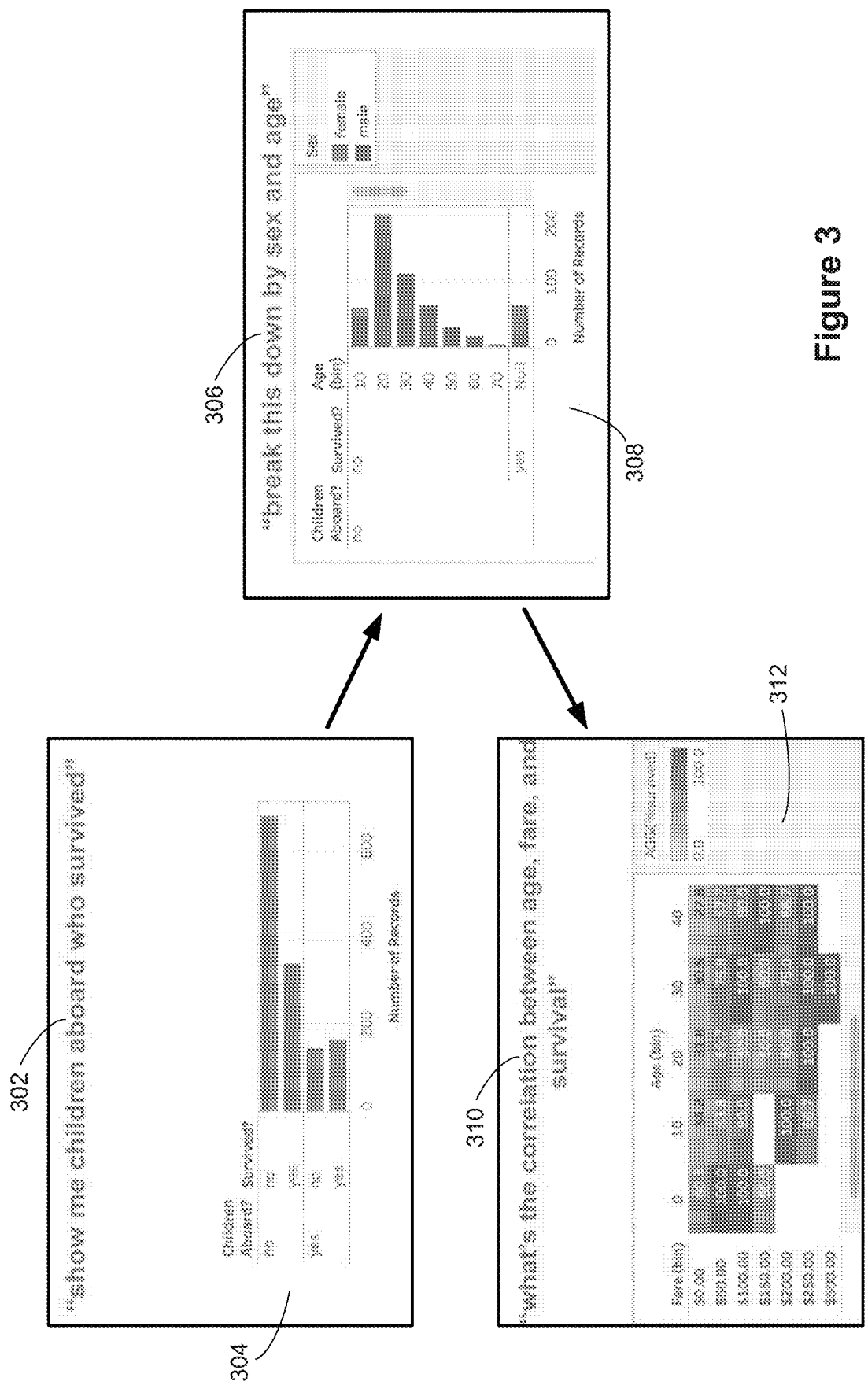
FIG. 3 illustrates how intent in analytical conversation is used to drive effective visualization responses, according to some implementations.

FIG. 3 illustrates how intent in analytical conversation is used to drive effective visualization responses, according to some implementations. In this example, the data set has information about passengers on the Titanic. A user makes an initial utterance 302 ("show me children aboard who survived"). In some implementations, the computing device 200 responds with the data visualization 304. The user may express an implicit intent using an anaphoric reference ("this" in this example) through the utterance 306 ("break this down by sex and age"). In response, according to some implementations, the computing device 200 responds by retaining the attributes "Children Aboard?" and "Survived?" in the visualization 308, while adding data attributes "Sex" and "Age" in a way that preserves the previous structure of the bar chart in the first visualization 304. Suppose now the user utters another sentence 310 ("what's the correlation between age, fare, and survival"), which has an implicit intent of asking for a "correlation." The factors ("age," "fare," and "survival") suggest a new visualization, such as a heat map, to depict the correlation between the data attributes "% survived," "Age," and "Fare." The computing device 200 responds by generating the third visualization 312, according to some implementations.

Figure 4A:
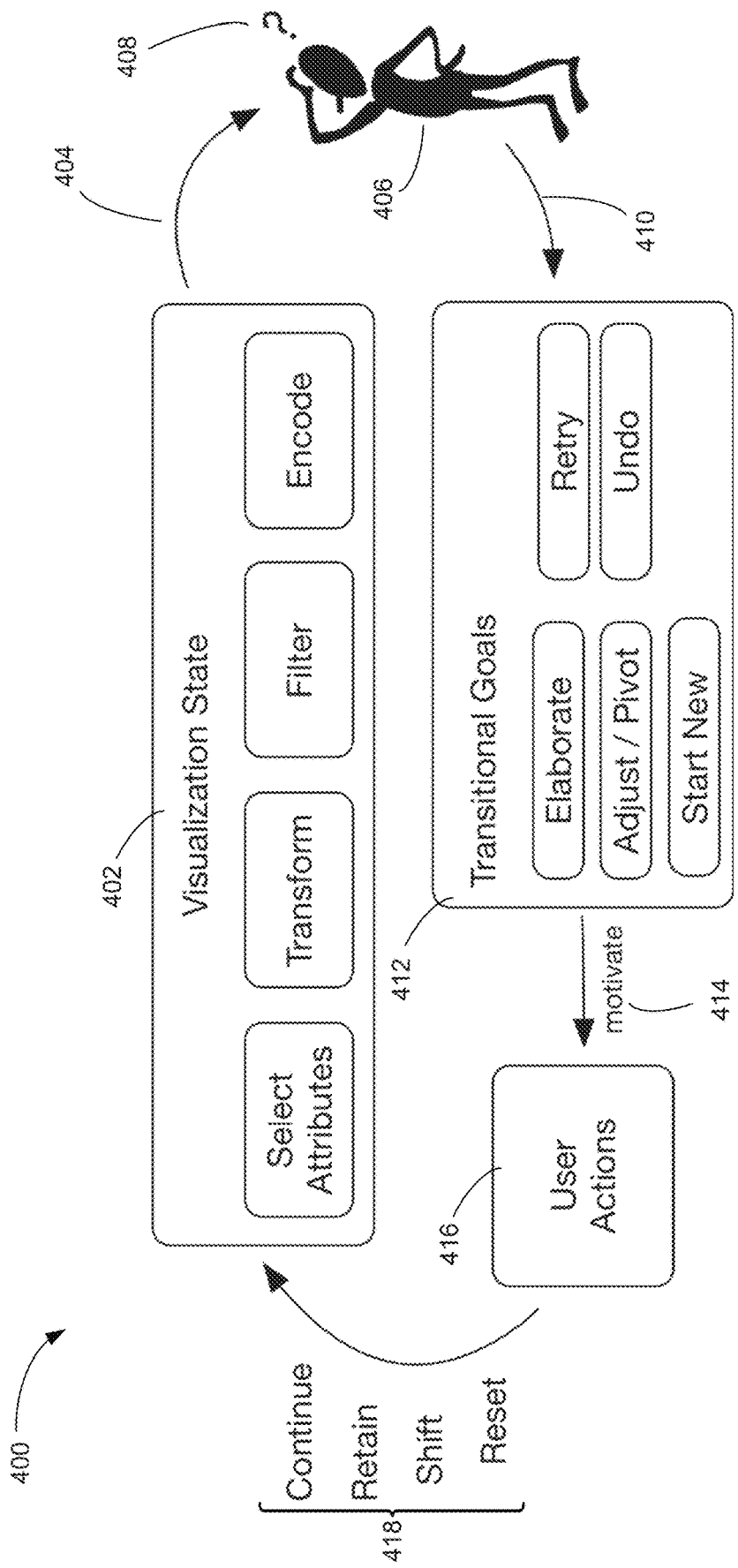
FIG. 4A is a block diagram illustrating a conversational transitions model 400, according to some implementations.

FIG. 4A is a block diagram illustrating a conversational transitions model 400, according to some implementations. The model 400 describes how to transition a visualization state during a visual analytical conversation. The model extends the visualization reference model (Readings in information visualization: using vision to think. Morgan Kaufmann, 1999, by CARD S. K., MACKINLAY J. D., SHNEIDERMAN B) which describes the visualization cycle in general terms. The model also extends the concepts of conversational centering (Attention, intentions, and the structure of discourse. Computational Linguistics 12, 3 (July 1986), 175-204. 2, 4, 6, 7, 9, 10, by GROSZ B. J., SIDNER C. L.), a model commonly used for discourse structure in human communication. Each of these is incorporated by reference herein in its entirety.

According to some implementations, in model 400, visualization state 402 is comprised of the data attributes in play (e.g., data fields from a selected data source), transformations (e.g. calculations to create derived attributes), filters, and the visual encoding of attributes (e.g., as depicted graphically in the interface 100 by assigning data fields to shelves). After interpreting 404 a visualization, a user 406 continues the analytical conversation by identifying a new question 408 to ask. This analytical intent 408 ultimately drives (410) the user's transitional goals 412 (how to transform the existing visualization to answer the new question), which in turn drives or motivates (414) user actions 416, according to some implementations. According to some implementations, the transitional goals 412 comprise: elaborate (add new information to the visualization), adjust/pivot (adapt aspects of the visualization), start new (create an altogether new visualization), retry (re-attempt a previous step that "failed"—either for technical reasons, such as a query timeout, or because the previous command failed to convey the desired visualization), and undo (return to the prior state). According to some implementations, a visualization system 200 updates the visualization state 402 in response to user actions 416. In some implementations, the visualization system uses centering theory transitional states 418 (e.g., transitional rules continue, retain, shift, and reset) for maintaining conversational coherence from one visualization state to the next. Examples of visualization systems that use centering theory include Evizeon. See, e.g., U.S. patent application Ser. Nos. 15/486,265 and 15/804,991, each of which is incorporated by reference herein in its entirety. These systems use transitional rules to update filter states in response to natural language utterances. In some implementations, the transitional rules 418 are applied to all elements of the visualization state (attributes, transformations, filters, and encodings), not just to filters. According to some implementations, the model 400 is used to design automated presentation systems (see, e.g., U.S. patent application Ser. No. 11/223,658, which is incorporated by reference herein in its entirety), which allow users to select attributes before applying transitional rules 418 to create a visual encoding. Present implementations are more helpful because they infer missing attributes and/or intended calculations, and consider how a user might expect the data to be represented.

Some implementations use intent to effect changes to all of the elements of the visualization state 402. Some implementations enable users to adapt visualizations or change system behavior to answer more questions through filter controls and interactive legends, or by providing data in context (e.g., instead of filtering to a named value, some implementations show the target value in comparison to alternatives within the visualization; for example, in relation to FIG. 3, the answer to "how many people survived?" is more interesting in comparison to the number who did not survive).

Some implementations include a filtered attribute as an encoded variable in the visualization supported follow-up actions. By adjusting the filter control, a user obtains a useful comparison visualization. Some implementations anticipate future user needs by adding more information than requested. As a simple example, when asked how many children were under the age of 10 (in the Titanic example), the system responds with an age histogram showing frequency of all age groups. Some implementations support transformations by binning quantitative variables or creating calculations, such as percentages, change the default ordering of attributes, on x and y axes, to create a hierarchy suited to the question, add redundant color encoding for an important variable (typically the focal attribute of a compare action), and/or create custom encodings such as a non-default chart type.

Intent Deduction

According to some implementations, a session occurs when a user 406 issues multiple utterances consecutively to a Natural Language (NL) interface (e.g., using the natural language processing region 124 in the user interface 100) in the pursuit of satisfying one or more visual analysis needs. Sessions are driven by utterance reformulations, which are user controlled acts of modifying an existing query in order to pursue new search results. In some instances, utterance reformulations are closely related to the user's previous query and reflect the shifting cognition of the user throughout the session search. In some instances, the user intent can change throughout the session, whether through generalization, specialization, or other thought flow, which leads to variations in the utterances used to describe the intent.

Utterance Reformulation and Chunking

According to some implementations, discourse chunks are minimal syntactic units that are chained sequentially in a given discourse or conversation, expressing a common purpose by the user. The system labels and reformulates each utterance in a discourse. Some implementations use a term vector representation of the utterance (with term frequency as the term weights) and represent each utterance as the set of its terms. Some implementations track the changes between utterances in a session to help identify the various transitional states. Some implementations extract each pair of utterances in a session. Some implementations remove punctuation and tokenize all textual content, and apply word stemming. Some implementations treat each term source (i.e., the utterance) as a bag of words. In some implementations, given that typically only one or two terms are added or removed from adjacent queries in a session, a unigram model is sufficient.

Some implementations employ a computational approach based on discourse chunking theory to identify utterance reformulations that the user makes during the course of an analytical conversation. In particular, some implementations apply the techniques described below to identify utterance reformulation, and subsequently segment the utterances into disparate conversation chunks.

Utterance Similarity

Some implementations measure the similarity between utterances to resolve some of these questions and build a model of user intent during an a visual analysis session. Some implementations interpret utterance reformulations using terms specified in these utterances. Some implementations handle term retention and removal by analyzing adjacent and non-adjacent utterances in sessions. Some implementations use the analysis of text similarities between utterances to identify reformulations using the following metric:

$$\text{Jaccard}(U_1, U_2) = \frac{|U_1 \cap U_2|}{|U_1 \cup U_2|}$$

In the equation above, $U_1$ and $U_2$ are sets of terms that appear in two utterances. Jaccard similarity is commonly used in measuring set similarity. In some implementations, a Jaccard similarity value >=0.6 is used to identify similar utterance reformulations. For example, the utterances "passengers of each sex shown as percent of total, colored by survived" and "survivors of each sex shown as percent of total, colored by survived" are identified as similar given that the participant refined a single term from the first utterance.

Anaphora

Figure 4B:
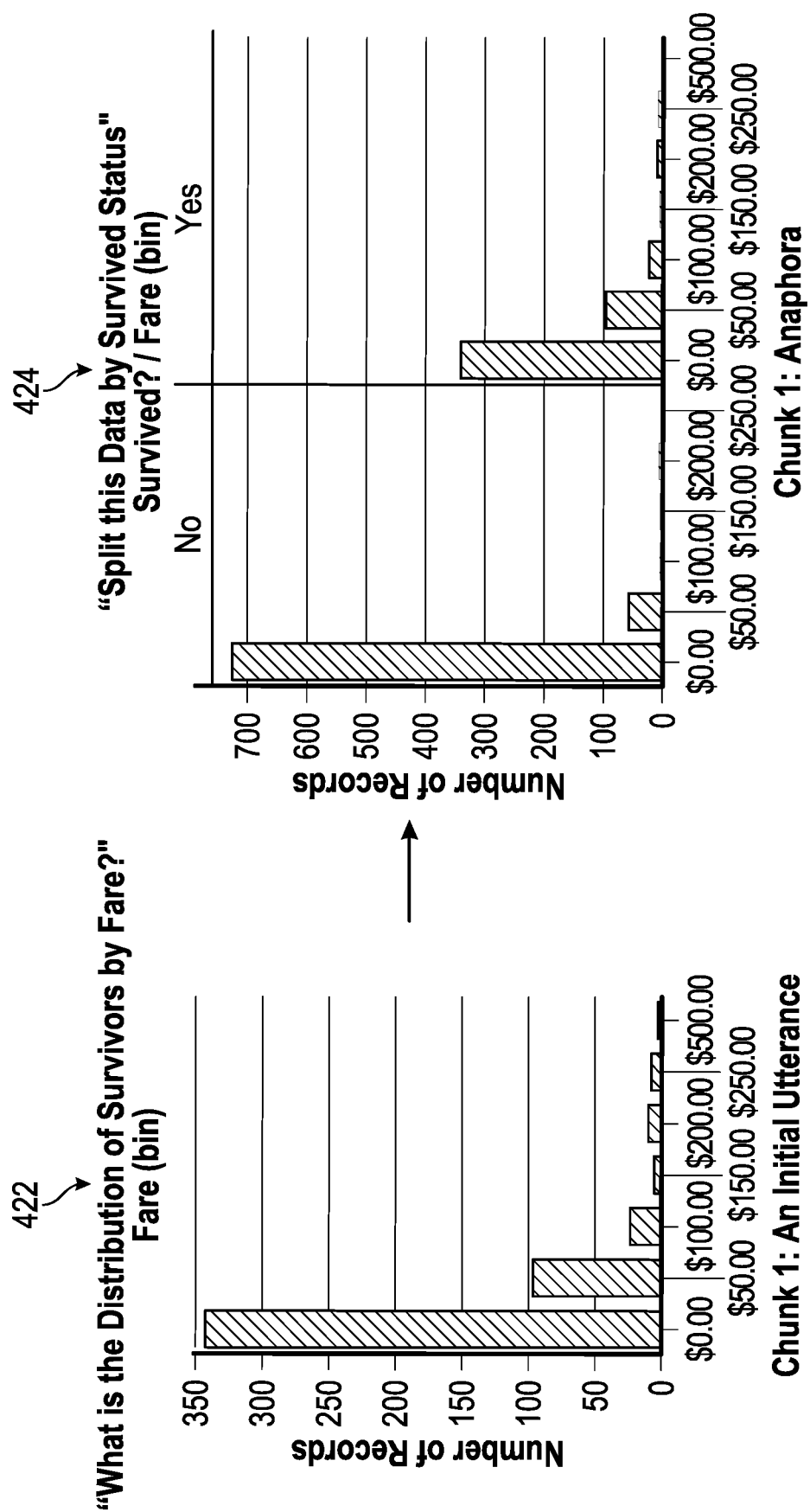
FIGS. 4B and 4C illustrate the principles of anaphora and discourse marking, according to some implementations.

In linguistics, anaphora is the use of an expression, typically a pronoun whose interpretation depends upon an antecedent expression. In some implementations, based on conversation centering literature a given utterance with anaphora is considered as part of the same chunk if the pronoun refers to the backward-looking center of the current utterance. FIG. 4B illustrates these principles with an example snippet of an analytical conversation from a session.

Figure 4C:
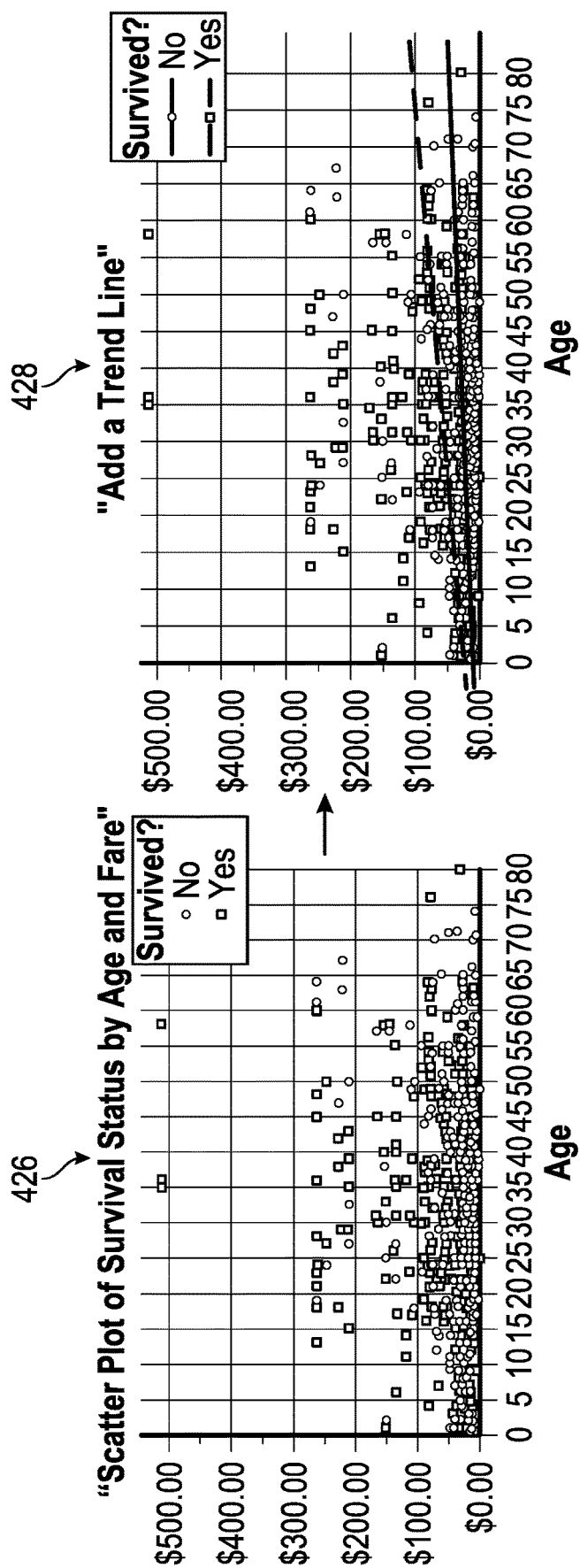

The conversion from FIG. 4B continues in FIG. 4C, but utterance chunking places the utterances of FIG. 4C into a separate chunk based on discourse heuristics for anaphora and discourse markers. In this example, the user makes an initial utterance 422 ("What is the distribution of survivors by fare?") and the system identifies this utterance as the start of chunk 1. The second utterance 424 ("split the data by survived status") shows an example of anaphora (the term "this") pertaining to the data in the previous utterance, which is recognized to be a part of chunk 1, according to some implementations.

Discourse Markers

Discourse markers are used to indicate boundaries of a chunk to identify a change in transition of the topic. In some instances, a user uses discourse markers, such as "reset" and "start over" or a data visualization type (e.g., "line chart" or "heat map"), to indicate a new chunk of conversation that effectively creates a new context and shifts the topic of inquiry. In addition, discourse markers such as "add," "split," "remove," "color," "label," and "break down by" indicate a retain or continue transition within a chunk. FIG. 4C illustrates these principles. A discourse marker "scatter plot" in the third utterance 426 marks the beginning of a new chunk 2 in the conversation as the user shifts to a new information need. However, the term "add" in the fourth utterance 428 indicates adding to the previous context rather than creating a new utterance chunk, according to some implementations. The number of utterances in a chunk and the number of chunks in a session can vary widely depending on the data set, the user, and the user's goals.

Transitional Intent

According to some implementations, once conversational chunks are identified, alouds are used to infer users' transitional goals and corresponding transition states for every utterance. In some implementations, transitional states of continue, retain, shift, or reset are applied to each component of the visualization state to fully describe an intended transition. FIG. 5A illustrates examples of cues suggesting intended transitions, according to some implementations. Some implementations use different approaches to transitioning the state depending on whether the system recognizes prior context or not. In the absence of context, users sometimes repeat all or parts of prior utterances, or slightly rephrase them using synonyms or different grammar.

Many of these strategies are also used when the system supports context and the users rely on the context. Some implementations also employ strategies involving short follow-on utterances. When there is contextual information, to express an intent to start over, users can either use an explicit reset command or fully qualified utterances with minimal overlap with the prior visualization state. Incomplete utterances are recognized to carry on context, especially if they included anaphoric references (e.g. "this" or "these") or adjustment keywords (e.g. "add," "include," "instead of"). Sometimes an explicit encoding directive can indicate whether to SHIFT or CONTINUE context. For instance, since color can encode using only one variable at a time, "color by class" indicates an attribute SHIFT if color is already encoding using another attribute.

Visualization State Intent

FIG. 5B illustrates examples of cue words used to infer intent around visualization states, according to some implementations. Setting aside the issue of transition from the prior state, intent around attributes and filters are identified from the text utterances, since users tended to explicitly name attributes and/or values (often with synonyms). A major exception to this general rule is frequent ellipsis of a measure (leaving out an explicit reference to a numeric data field or numeric calculation). For example, "male vs female by survived?" does not specify that the user wishes to see a count of records. Some implementations employ a rule that infers COUNT(Records) when no measure or aggregation is specified. Some implementations do not use a literal interpretation of filters. For categorical attributes with only a small number of categories (e.g., for the categorical data field medal type, there are only three distinct values: "Gold," "Silver," and Bronze"), some implementations look for the name of one of the categories in the user input and/or a comparison to other categories. For instance, for the utterance "how many people survived?" (survived?=yes), some implementations generate a response that compares the number survived to the number that did not survive (survived?=no).

Some implementations infer intent around transformations partially by identifying keywords. For example, the intent to bin a continuous variable (e.g., splitting the data values for a continuous numeric variable into a small number of continuous, non-overlapping ranges) is identified with terms such as "group" or "bin." derived calculations may be identified by words like 'rate' or 'proportion'. Some implementations consider ambiguity around the meaning of percentage calculations for determining a transformation type.

Some implementations infer intent around expected visual encodings using partially specified user information. For example, users may specify only the data they wish to see, and the implementation decides how to visualize the result. Explicit cues about visual encodings include named chart types (e.g., "crosstab" or "heatmap") and named visual variables (e.g., "colored by gender" or "survival % as size"). Implicit cues do not directly identify a visual encoding, but specify why the user wants to see the encoding. These why statements match either Targets (e.g., correlation, distribution, extremes) or Actions (e.g., compare, summarize, identify).

Some implementations apply transition states of continuing, retaining, and shifting to each component of a visualization state (attributes, transformations, filtering, and encoding) to maintain conversational coherence. In some implementations, since explicit intent requests, such as those in the middle column of FIG. 5A, clearly state what a user expects to see, the requests are prioritized over other inferences. For example, in the utterance "Cases by location colored by disease," the user clearly indicates how the disease attribute should be encoded. Implicit intents do not directly specify encodings, but visualization best practices suggest encoding heuristics once the intent is known.

When the user expresses explicit intent around visual encodings (e.g., a chart type or specific shelf placement), some implementations restrict the set of user options to the matching subset and choose the best of those options using rules. If the specification results in an empty set because the requested encoding is impossible, some implementations ignore the explicit intent and default to heuristics.

Figure 6A:
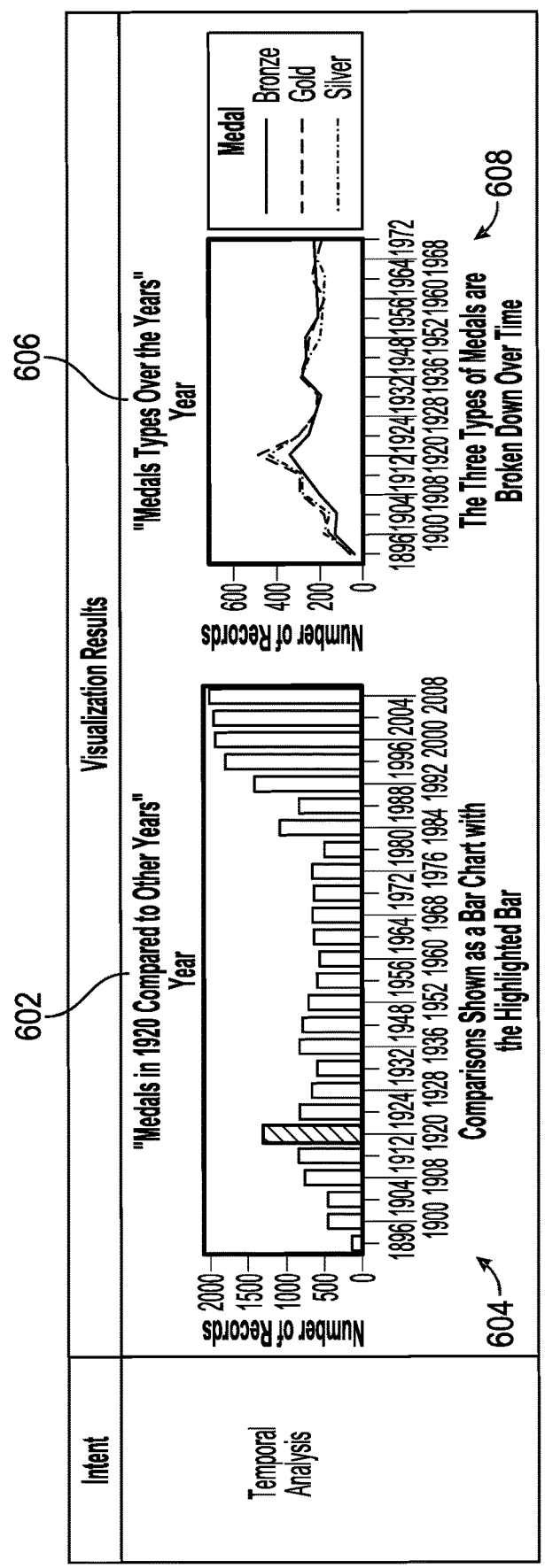

According to some implementations, actions and targets are identified from natural language utterances. FIGS. 6A-6F illustrate several examples of how such identified actions and targets are translated to suitable visualizations (e.g., by linking them to best practices for common business goals). FIG. 6A illustrates temporal analysis. In the example shown, the first utterance 602 "Medals in 1920 compared to other years" identifies a target value (1920) and a compare action. Some implementations respond with a bar chart 604 highlighting the target item. Contrast this with the next example response for the second utterance 606 "Medal types over the years." The data content is similar but the target is a trend, suggesting a line chart, so some implementations respond with a line chart 608. Some implementations employ heuristics around temporal data when at least one data attribute is identified. Some implementations always place date or time on the x-axis. Some implementations use a default line chart if the target is a trend or unspecified. Some implementations use a bar chart and highlight the dates/times of interest if the target is specific time points (e.g. outlier dates) or the intended action is to compare specific dates/times to the rest.

Figure 6B:
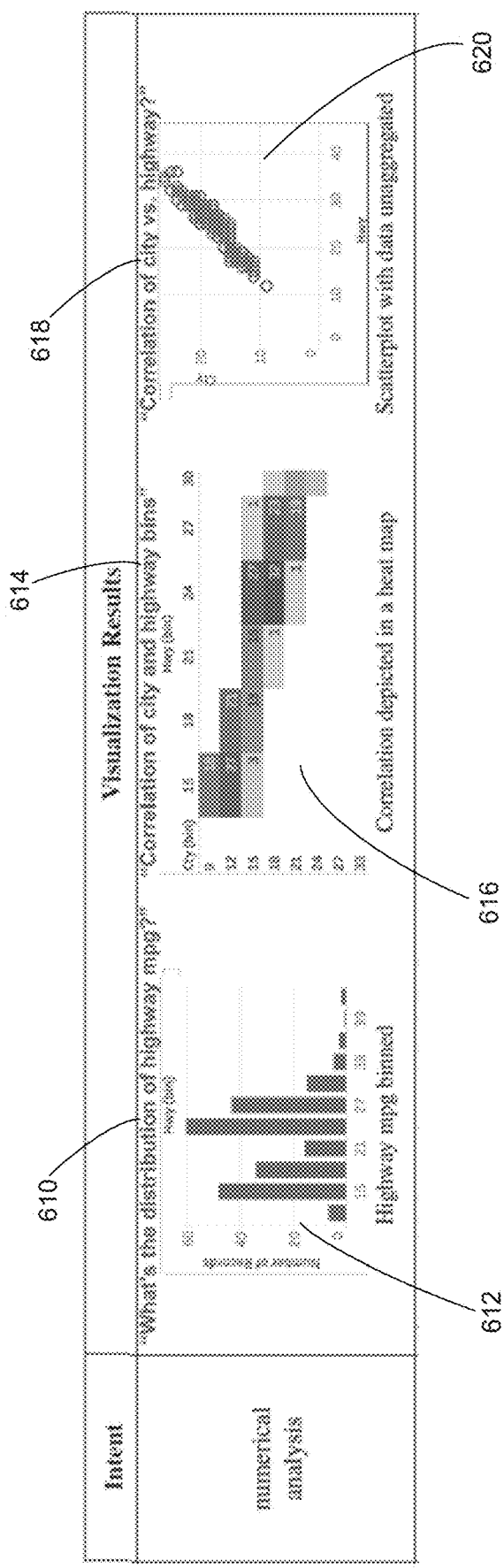

FIG. 6B illustrates numeric analysis. The first utterance 610 "What's the distribution of highway mpg" identifies a distribution target suitable for a histogram 612. For the second and third example utterances 614 and 618, the correlation target is revealed in a scatterplot 620 (if the variables are continuous) or highlight table 616 (if discrete). If the target is a distribution, some implementations use a histogram and place the numeric attribute on the x-axis. Some implementations also apply a binning transformation. If the target is correlation of two or more continuous numeric attributes, some implementations prioritize a scatterplot. If the target is correlation of two or more discrete numeric attributes, some implementations prioritize a highlight table. If the action is to compare values of two or more numeric measures per category, some implementations prioritize a bar chart. Some implementations also place measures at the end of the row/column shelf (thereby using the dimensions to create panes). If color is unused after encoding all variables, some implementations redundantly encode measure names with color.

FIG. 6C illustrates categorical analysis. For an overview of many attributes, like the first utterance 622 "Show medals by gender and discipline," a compact heat map representation 624 is used, according to some implementations. In contrast, the second utterance 626 "Compare men and women for aquatics" specifies a comparison of the target attribute Gender. Some implementations place the target values side by side, as shown in the view 628, redundantly encoded with color. Alternatively, if the target is an extreme, as in the third utterance 630 "Model with highest city mpg," the target item is sorted to the top and highlighted, as shown in the third visualization 632. In some implementations, if the action is to summarize two or more categorical dimensions, a heat map is preferred over bar charts. Heat maps are space-saving and reduce the need for scrolling. Some implementations distinguish amongst comparison attributes. For example, if one categorical attribute is identified as the primary target of comparison, some implementations place that attribute in rows or columns. For example, in the utterance "compare survival rate by class, for each sex and whether or not children were aboard", class is the primary comparison attribute. If color remains unused after encoding all other attributes, some implementations redundantly encode the primary target using color. If the target is an extreme (e.g. highest or Top N), some implementations sort to bring the target extreme to the top, left, or a more visible section on a display. If specific categorical values are the focus, some implementations highlight those values.

Figure 6E:
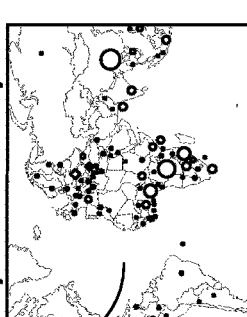
Figure 6F:
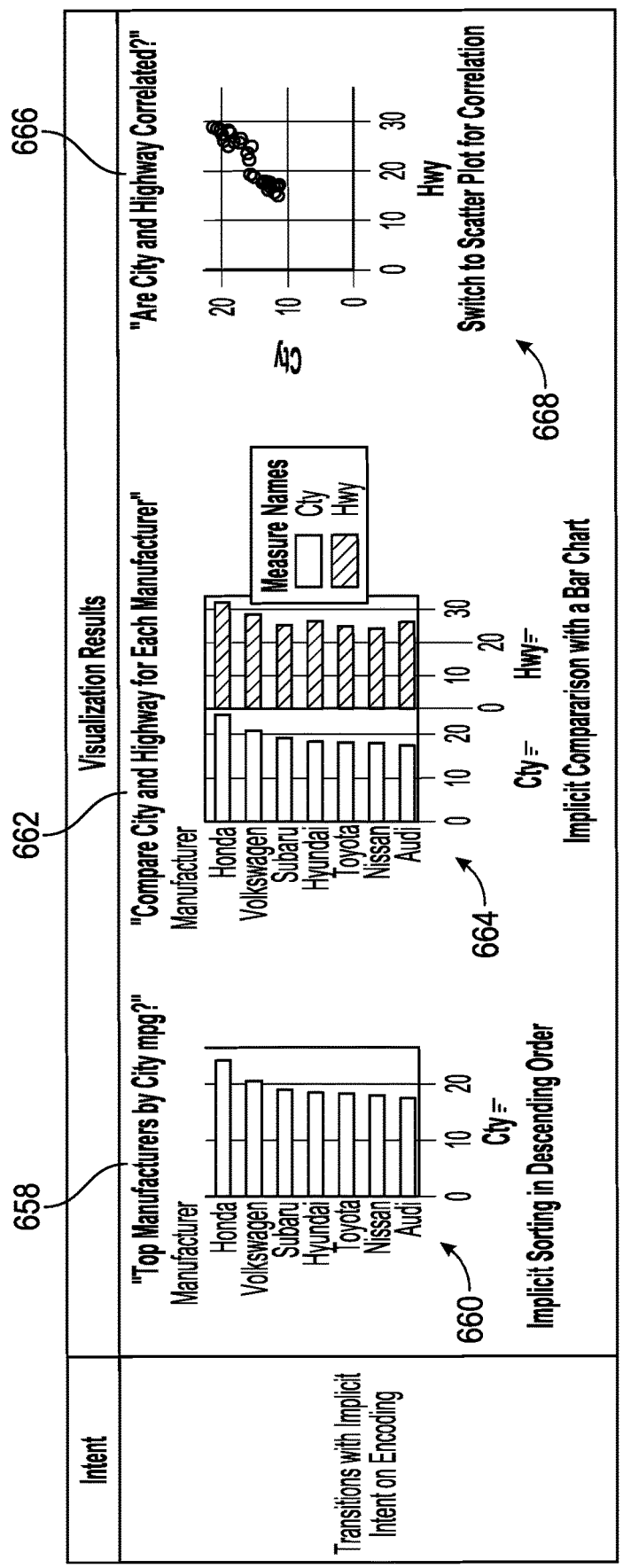

FIG. 6D illustrates transitions with no intent on encoding. The example utterances 634, 638, and 642 result in the visualizations 636, 640, and 644 respectively. In contrast, FIG. 6E illustrates transitions with explicit intent on encoding. The example utterances 646, 650, and 654 result in the visualizations 648, 652, and 656 respectively. Similarly, FIG. 6F illustrates transitions with explicit intent on encoding. The example utterances 658, 662, and 666 result in the visualizations 660, 664, and 668 respectively. Some implementations use intent to prioritize transitional goals because two user goals could require different visual encodings for the same data content. Some implementations use the model 400 for automatic presentations.

Supporting Transitions

Some implementations maintain within-segment coherence of visualization states. Like human conversations, a conversation with data needs to maintain coherence from one state to the next. Part of this coherence is maintaining content (attributes, transformations, and filters) from the prior state when the user intends to elaborate, adjust, or pivot the line of inquiry. An equally important aspect is maintaining coherence in the visual encoding, as abrupt changes to the way data is represented can be jarring and easily misinterpreted. FIGS. 6A-6F (described above) show several examples where the visualization state is only minimally changed from one step to the next.

Some implementations prioritize intent over coherence. Explicit or implicit intent may conflict with the goal to maintain coherence between states. Some implementations weigh the cognitive cost of interpreting a new encoding to gain a better visualization for one's task. For example, in FIG. 6F, the second utterance 662 requires only minimal changes to the view; however, supporting the correlation target in the third utterance 666 requires a substantial encoding change. Some implementations employ prioritization for follow-on utterances.

Anticipating User Needs with Proactive System Design

Some implementations anticipate user needs and proactively provide more information than requested. Examples include adding unnamed attributes, performing transformations to useful metrics such as percentages, showing requested data in context with a comparison group, and placing filtered attributes on the x or y axis so that later filter changes would result in a useful comparative visualization.

The conversational transition model 400 extends two previously unconnected bodies of theoretical work: visualization reference models and linguistics centering theory. While the model 400 is described above in the context of natural language interaction, the model is also employed in contexts other than those already described. For example, some implementations maintain coherence through an analytical conversation regardless of the input technique (e.g., mouse, touch, gesture, speech, eye gaze, or multimodal input). Furthermore, some implementations have mechanisms for understanding user intent for any of these modalities.

Intent-Based Automated Visual Encodings

Some implementation infer intent and use the inferences to create a visualization in response. In some instances, users tend to only partially specify visual encodings. Some implementations apply the model 400 and additionally define a set of visual encoding heuristics that handle partial specifications. FIGS. 6A-6F provide several examples.

In some implementations, existing visualization heuristics are extended by ac-counting for explicit and implicit intent around visual encodings, and/or by supporting context through transition heuristics that adapt the prior visualization state.

Transition Heuristics

Like human conversations, a conversation with data needs to maintain coherence from one state to the next. Part of this coherence is maintaining content (attributes, transformations, and filters) from the prior state when the user intends to elaborate, adjust, or pivot the line of inquiry. An equally important aspect is maintaining coherence in the visual encoding, as abrupt changes to the way data is represented can be jarring and easily misinterpreted. The following set of heuristics to retain existing attribute encodings from one state to the next, to maintain encoding coherence when not at a conversational break.

Attribute SHIFT: when removing an attribute from a shelf, some implementations replace it with a new attribute of the same type and role. For a transformation shift that retains the data type, some implementations replace the original attribute with the transformed one.

Dimension CONTINUE: some implementations employ a "plus one" rule to add a new dimension to rows or columns by type affinity. Some implementations limit the maximum number of dimensions on the rows or columns shelves to two. If this limit is exceeded, some implementations search for another possible encoding for the new variable first. When adding a new dimension to a row or column shelf, some implementations add it at the end of the shelf to preserve the existing hierarchy. Some implementations recognize an exception to this rule when the last attribute on the shelf is a date or quantitative dimension and the new attribute is not. In this case, some implementations add the new dimension to the left of the last dimension (one level up the hierarchy).

Heuristic Priority

Several heuristics may be applied together to choose a visual encoding for attributes in response to a user query. In some implementations, the order of operations is chosen so as to ensure a successful result.

Consider a new conversational segment. The user has articulated explicit and/or implicit intent around encoding. Some implementations apply any explicit encoding requests first, to restrict the space of possibilities displayed to the user. Some implementations apply intent heuristics to re-rank the remaining options based on implicit intent, as applicable. Some implementations apply visualization rules (e.g., ShowMe rules, as explained in U.S. application Ser. No. 11/223,658) to choose possible visual encodings for any remaining attributes, within the selected chart type.

Consider a transition from a previous state when there is no intent around encodings. Apply RETAIN first with the existing attributes and visual encoding. Then apply SHIFT operations next, to swap shifted attributes into suitable shelf locations and remove undesired attributes. Next, remove any remaining old attributes that should not be present in the new state. For CONTINUE, some implementations successively apply the plus one rule (e.g., as explained in U.S. application Ser. No. 11/223,658) to add any remaining new attributes, but modify the plu one rule behavior according to row or column heuristics described above. For example, a line chart is CONTINUED by adding Gender, according to some implementations.

Consider transition and articulated encoding intent. If the encoding intent explicitly defines a mapping (e.g. "color by sex"), some implementations simply start with the existing state and then apply the new encoding to it as specified. If attribute transitions are unspecified, this can result in either a CONTINUE transition (by adding the attribute to a shelf that has available room) or a SHIFT transition (when the placement requires a substitution, such as on color). For example, in response to an utterance "color by medal type?", a medal chart is CONTINUED by adding Medal to the color shelf while RETAINING all other encodings. If the chart had already been color coded, in some implementations, this results in a SHIFT in the color attribute. Likewise, in some implementations, an example utterance "split by gender" results in Gender being added to the rows.

If the utterance includes an implicit encoding intent, then intent heuristics (emphasizing the best visualization for the task) and transition heuristics (emphasizing continuity) may contradict each other. In some implementations, implicit encoding intent takes priority. In other words, it is worth the cognitive cost of interpreting a new encoding to gain a better visualization for the task. Consequently, some implementations treat this case as if it were a new conversational segment, but then attempt to temper the amount of visual rearrangement in the last step, applying explicit and implicit intent heuristics, resulting in a visualization type. Some implementations apply rules to choose shelf locations for any remaining attributes, but when equally good as another alternative, RETAIN shelf placement of these attributes from the prior state.

Figure 7A:
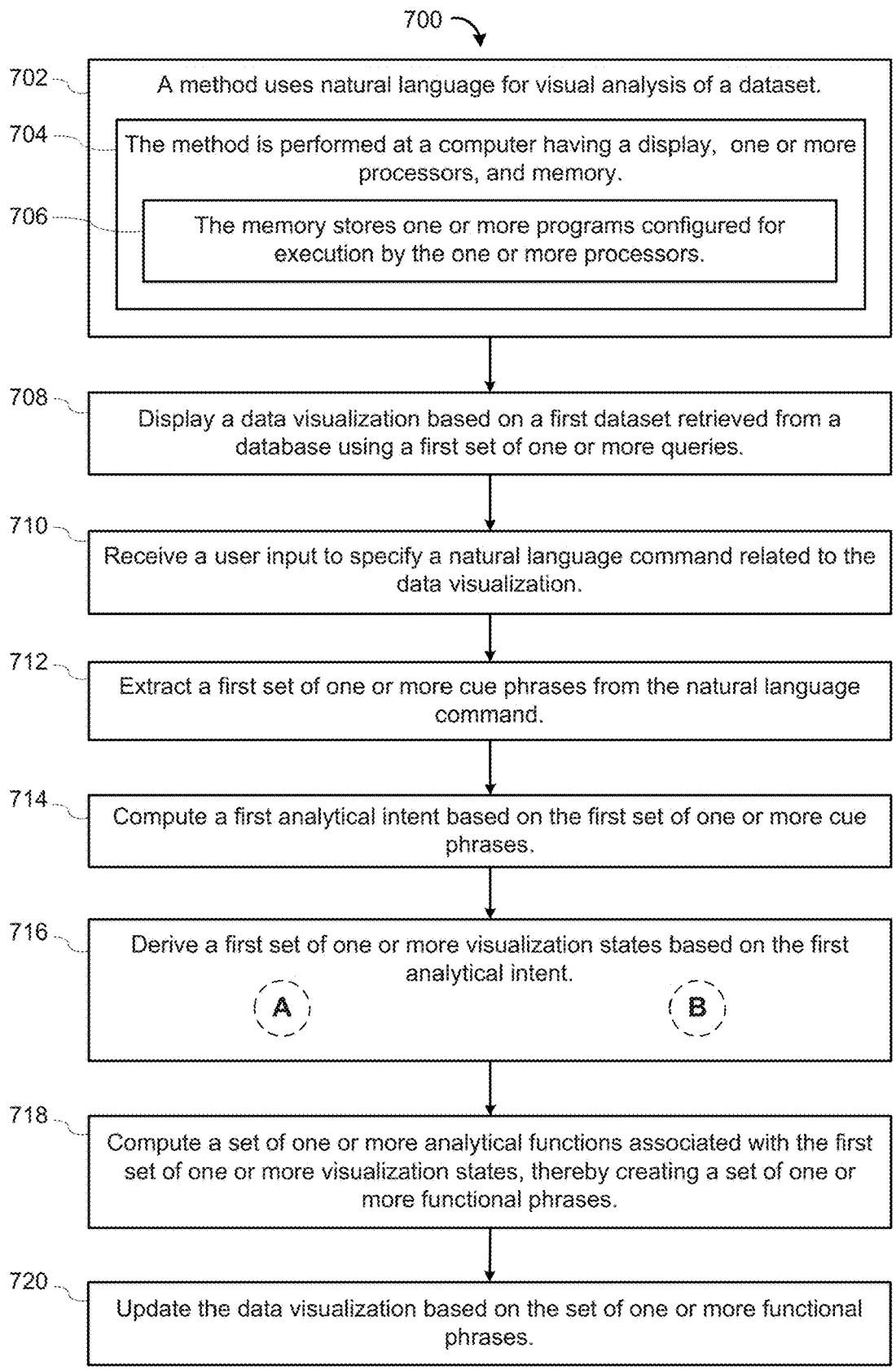
FIGS. 7A-7N provide a flowchart of a process that uses natural language for visual analysis of a dataset, according to some implementations.
Figure 7B:
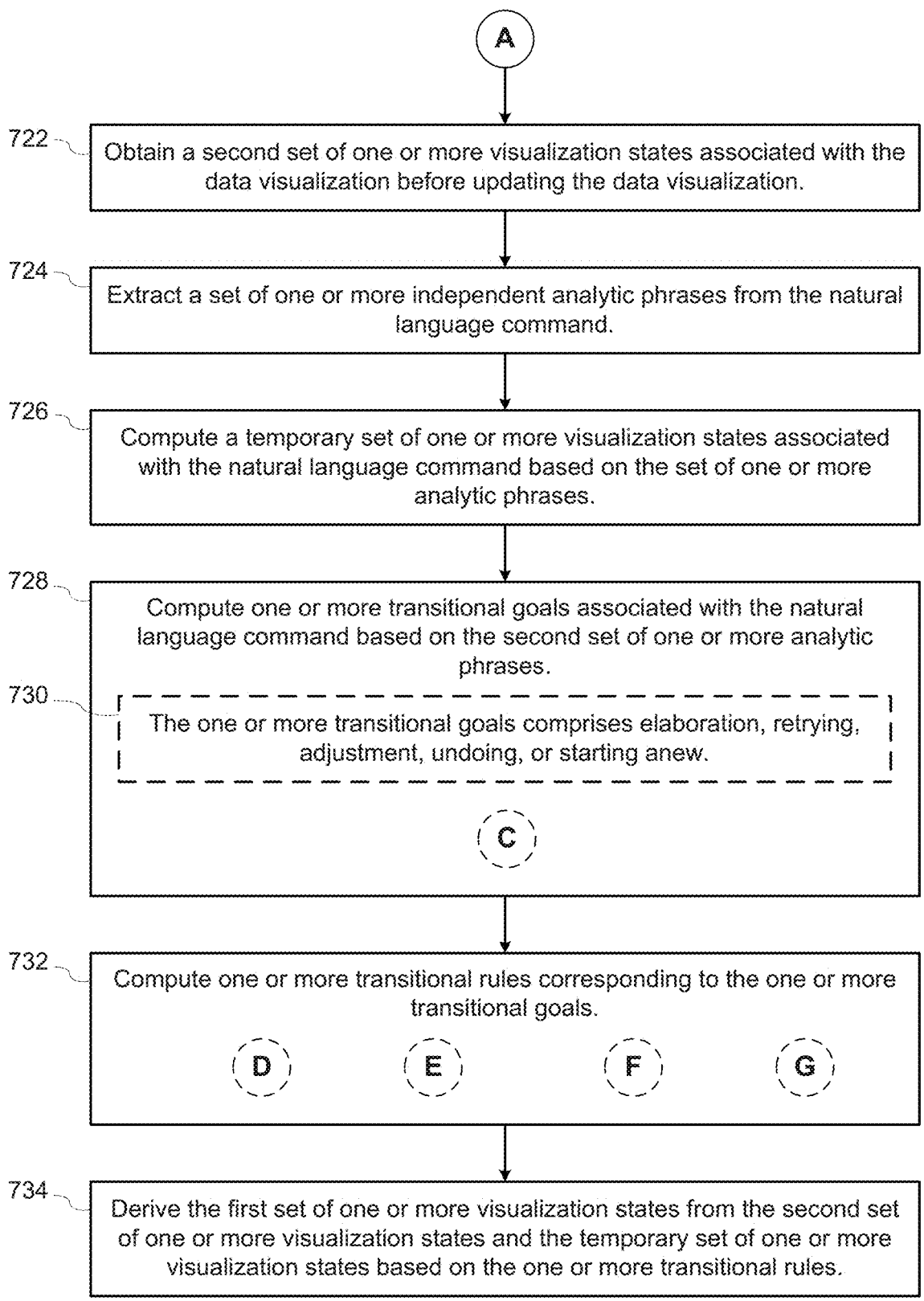
Figure 7C:
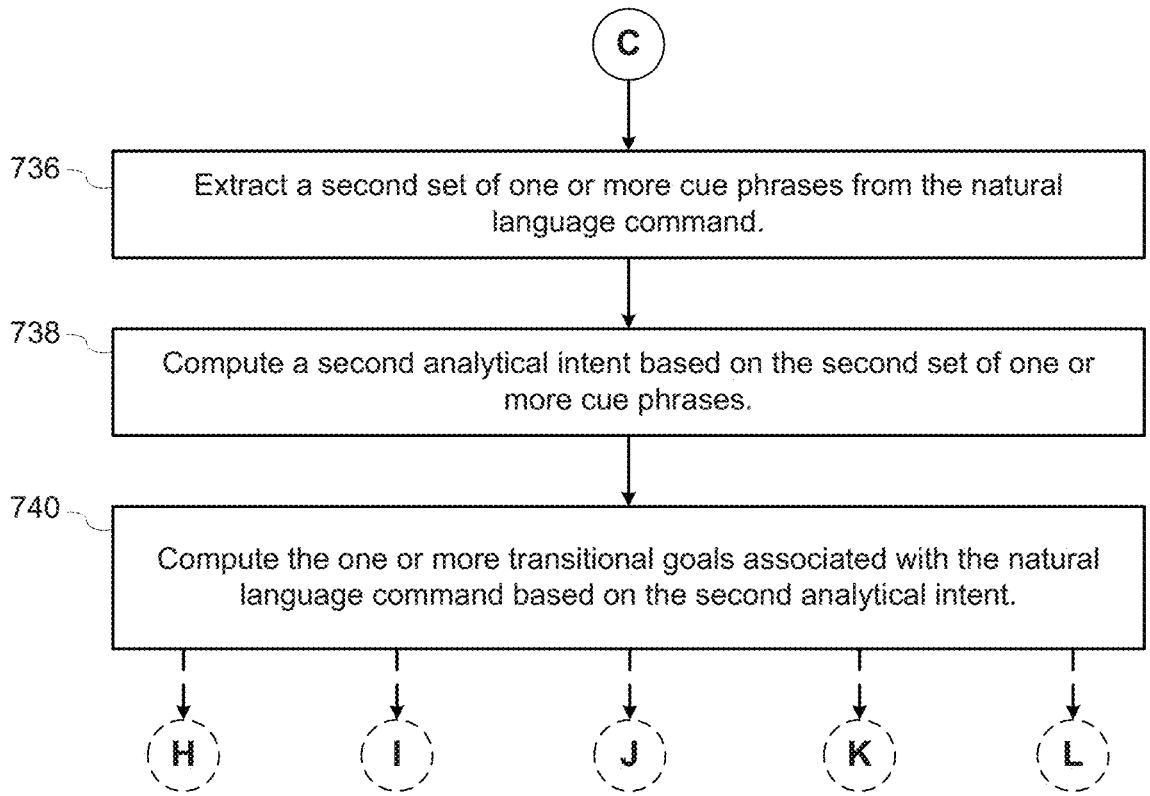
Figure 7D:
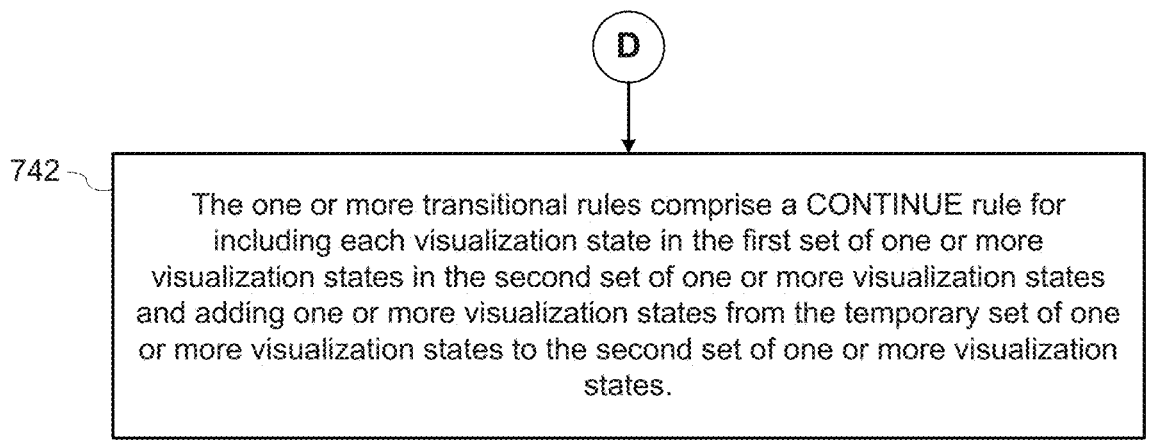
Figure 7H:
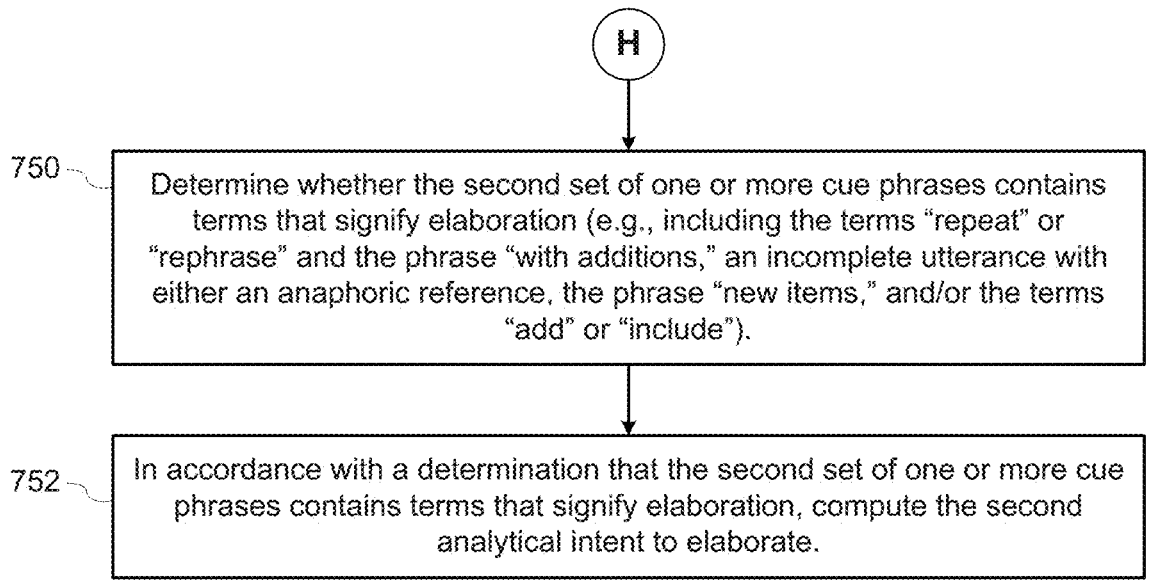
Figure 7I:
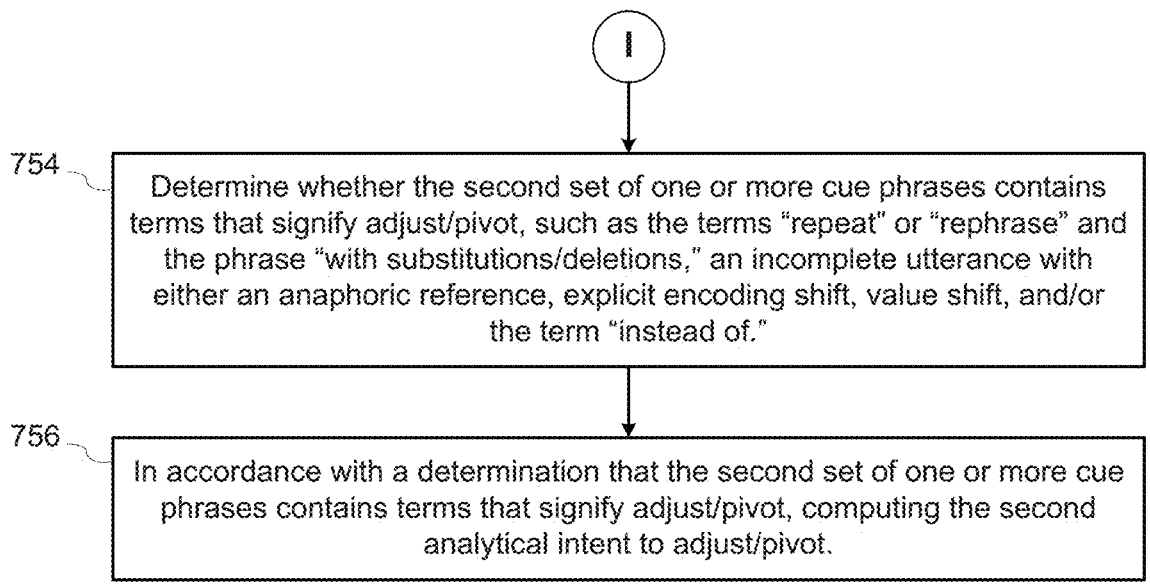
Figure 7J:
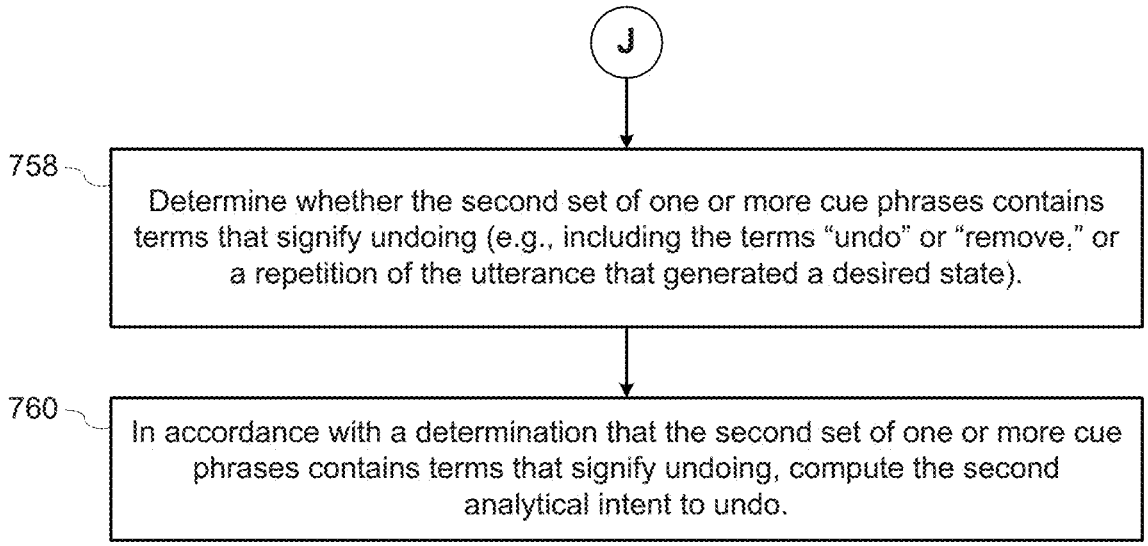
Figure 7K:
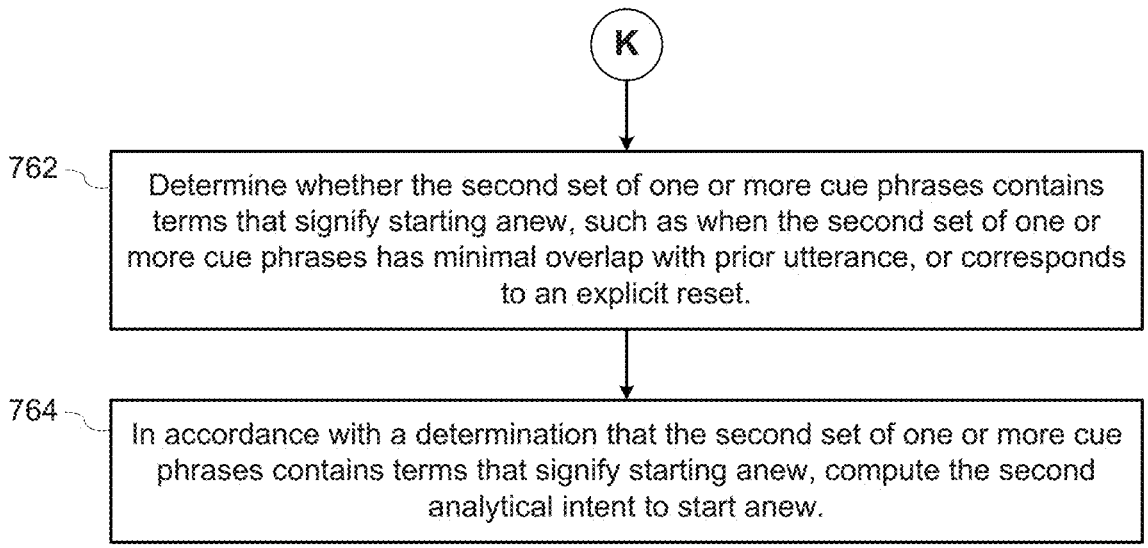
Figure 7L:
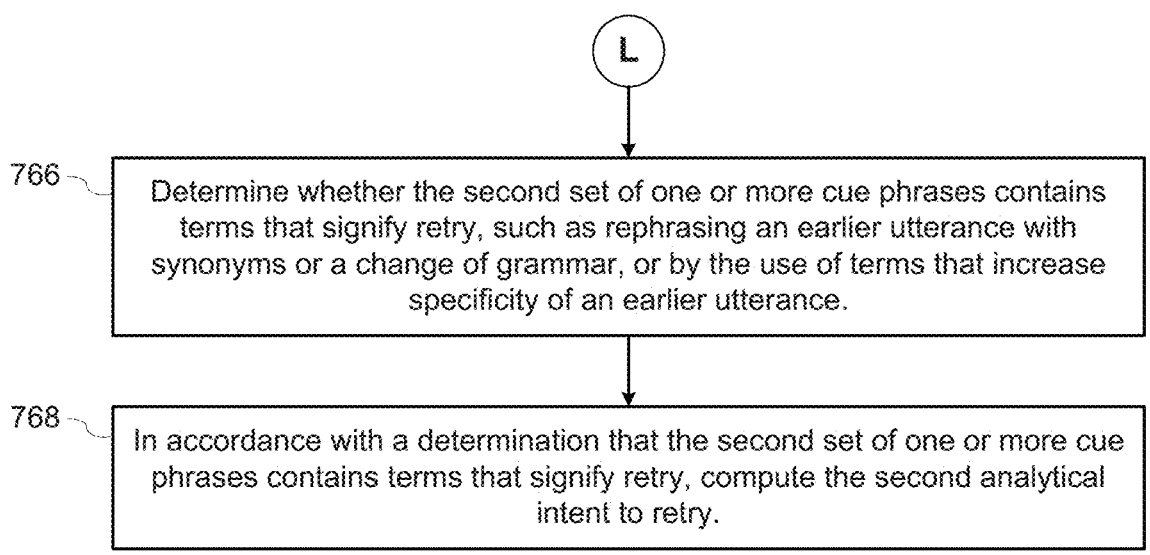
Figure 7M:
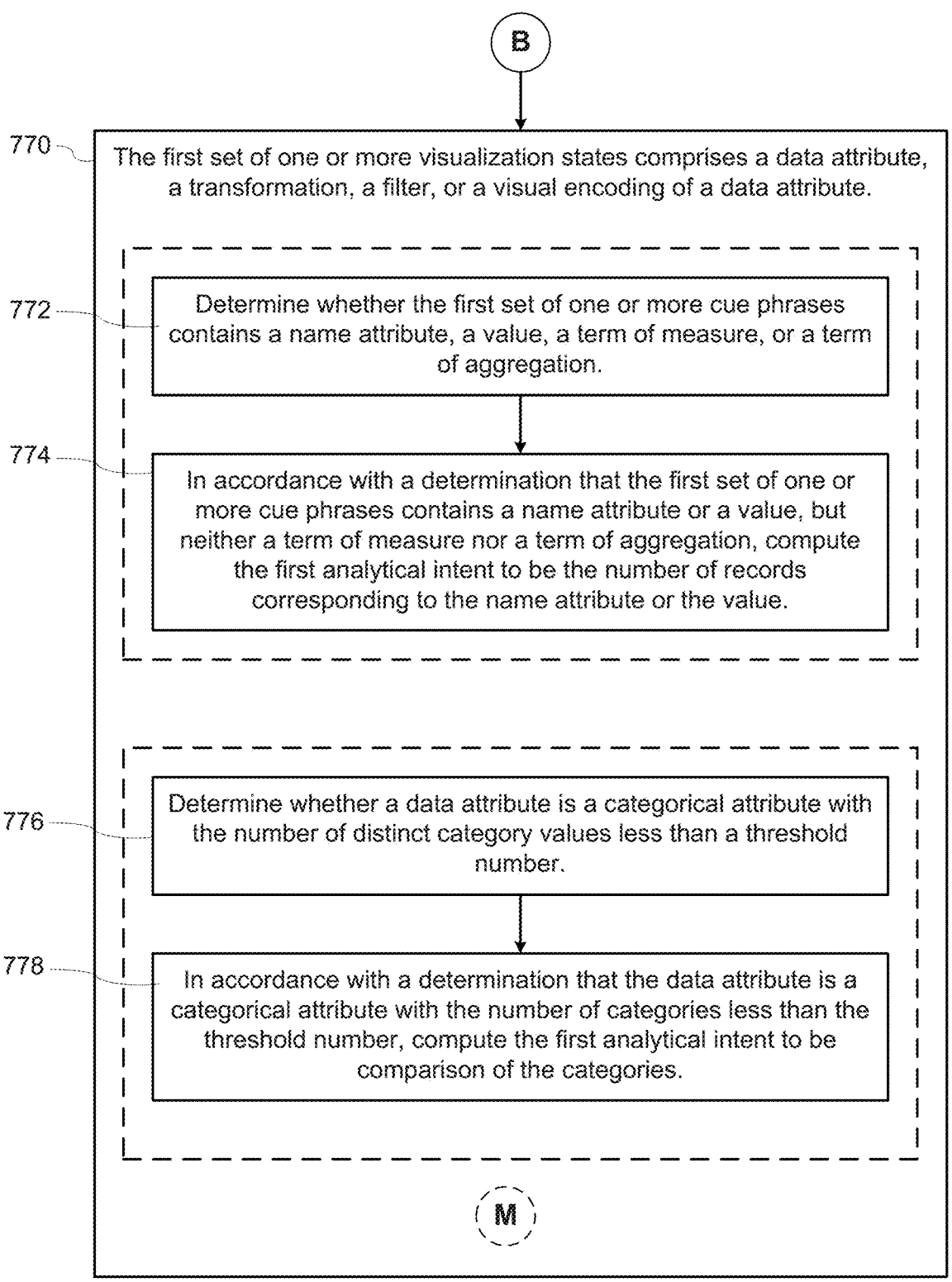
Figure 7N:
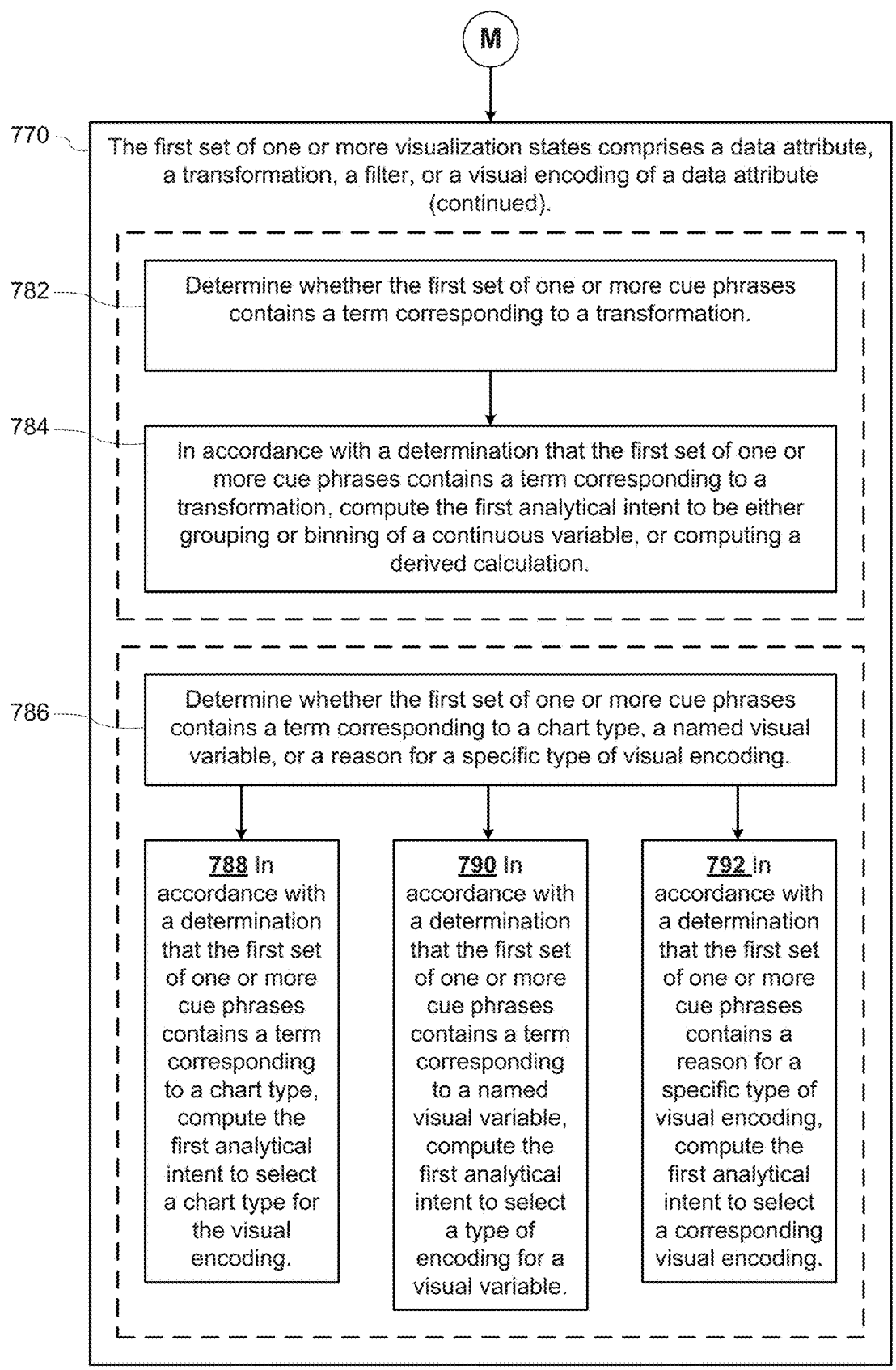

FIGS. 7A-7N provide a flow diagram illustrating a method 700 of using (702) natural language for visual analysis of a dataset. The steps of the method 700 may be performed by a computer 200. In some implementations, the computer includes (704) a display, one or more processors, and memory. FIGS. 7A-7N correspond to instructions stored in a computer memory or computer-readable storage medium (e.g., the memory 206 of the computing device 200). The memory stores (706) one or more programs configured for execution by the one or more processors. For example, the operations of the method 700 are performed, at least in part, by a data visualization generation module 234 and/or a language processing module 238.

In some implementations, the computer displays (708) a data visualization based on a dataset retrieved from a database using a first set of one or more queries. For example, referring to FIG. 1, a user may associate one or more data fields from a schema information region 110 with one or more shelves (e.g., the column shelf 120 and the row shelf 122) in the data visualization region 112. In response to receiving the user associations, the computer retrieves data for the data fields from the dataset using a set of one or more queries and then displays a data visualization in the data visualization region 112 corresponding to the received user inputs. Displaying data visualizations is discussed in further detail above with reference to FIG. 1.

The computer receives (710) a user input to specify a natural language command related to the displayed data visualization. In some instances, the user input is received as text input (e.g., a via keyboard 216 or via touch sensitive display 214) from a user in a data-entry region on the display in proximity to the displayed data visualization. In some instances, the user input is received as a voice command using a microphone 220 coupled to the computer. For example, in FIG. 3, the utterances 302, 306, and 310 may be specified by voice commands. Receiving inputs (e.g., commands/queries) from a user is discussed in further detail above with reference to FIGS. 1, 3, 4A-4C, and 6A-6F.

Based on the displayed data visualization, the computer extracts (712) a first set of one or more cue phrases (e.g., phrases shown and described above in reference to FIG. 5B) from the natural language command. For example, referring to FIG. 4B, the natural language command 424 received by the computer specifies "split this data by survived status." In some implementations, the computer extracts "split," "this," "by survived status" from the natural language command because these cue phrases relate to the displayed data visualization. When the phrases have direct reference to data fields in the displayed data visualization, the extraction (712) is straight forward: collect all phrases that are direct references to data fields. In some implementations, the computer stems or removes stop words, filler words, or any predefined set of words from the incoming query, and extracts (712) all other phrases from the natural language command because they may be related to the displayed data visualization. Some implementations use this approach when the phrases in the natural language command have some indirect reference to the data fields in the displayed visualization.

The language processing module 238 computes (714) a first analytical intent (sometimes called visualization state intent) based on the first set of one or more cue phrases. A framework for deducing visualization state intent is described above in reference to FIGS. 4A, 5A, 5B, and 6A-6F. The language processing module 238 then derives (716) a first set of one or more visualization states based on the first analytical intent. The language processing module 238 subsequently computes (718) a set of analytical functions associated with the first set of one or more visualization states, thereby creating a set of one or more functional phrases. The language processing module 238 then updates (720) the data visualization based on the set of one or more functional phrases.

As illustrated in FIG. 7B, in some implementations, the language processing module 238 obtains (722) a second set of one or more visualization states associated with the data visualization before updating the data visualization. This second set of one or more visualization states corresponds to the state of the visualization before it is updated. The language processing module 238 extracts (724) a set of one or more independent analytic phrases from the natural language command, and computes (726) a temporary set of one or more visualization states associated with the natural language command based on the set of one or more analytic phrases. The language processing module 238 then computes (728) one or more transitional goals associated with the natural language command based on the second set of one or more analytic phrases. Subsequently, the language processing module 238 computes (732) one or more transitional rules corresponding to the one or more transitional goals, and derives (734) the first set of one or more visualization states from the second set of one or more visualization states and the temporary set of one or more visualization states based on the one or more transitional rules.

In some implementations, the one or more transitional goals comprise (730) elaboration, retrying, adjustment (sometimes called pivoting), undoing, or starting anew. Referring now to FIG. 7C, in some implementations, the language processing module 238 computes the one or more transitional goals associated with the second analytical intent by extracting (736) a second set of one or more cue phrases from the natural language command, computing (738) a second analytical intent (sometimes called a transitional intent) based on the second set of one or more cue phrases, and computing (740) the one or more transitional goals based on the second analytical intent.

Referring next to FIG. 7H, in some implementations, the language processing module 238 determines (750) whether the second set of one or more cue phrases contains terms that signify elaboration (e.g., including the terms "repeat" or "rephrase" and the phrase "with additions," an incomplete utterance with either an anaphoric reference, the phrase "new items," and/or the terms "add" or "include"). In accordance with a determination that the second set of one or more cue phrases contains terms that signify elaboration, the language processing module 238 computes (752) the second analytical intent to elaborate. As shown in FIG. 7I, in some implementations, the language processing module 238 determines (754) whether the second set of one or more cue phrases contains terms that signify adjust/pivot, such as the terms "repeat" or "rephrase" and the phrase "with substitutions/deletions," an incomplete utterance with either an anaphoric reference, explicit encoding shift, value shift, and/or the term "instead of." In accordance with a determination that the second set of one or more cue phrases contains terms that signify adjust/pivot, the language processing module 238 computes (756) the second analytical intent to adjust/pivot.

Referring next to FIG. 7J, in some implementations, the language processing module 238 determines (758) whether the second set of one or more cue phrases contains terms that signify undoing (e.g., including the terms "undo" or "remove," or a repetition of the utterance that generated a desired state). In accordance with a determination that the second set of one or more cue phrases contains terms that signify undoing, the language processing module 238 computes (760) the second analytical intent to undo. As shown in FIG. 7K, in some implementations, the language processing module 238 determines (762) whether the second set of one or more cue phrases contains terms that signify starting anew, such as when the second set of one or more cue phrases has minimal overlap with prior utterance, or corresponds to an explicit reset. In accordance with a determination that the second set of one or more cue phrases contains terms that signify starting anew, the language processing module 238 computes (764) the second analytical intent to start new. Referring next to FIG. 7L, in some implementations, the language processing module 238 determines (766) whether the second set of one or more cue phrases contains terms that signify retry, such as rephrasing an earlier utterance with synonyms or a change of grammar, or by the use of terms that increase specificity of an earlier utterance. In accordance with a determination that the second set of one or more cue phrases contains terms that signify retry, the language processing module 238 computes (768) the second analytical intent to retry.

Referring now back to FIG. 7D, in some implementations, the one or more transitional rules comprise (742) a CONTINUE rule for including each visualization state in the first set of one or more visualization states in the second set of one or more visualization states and adding one or more visualization states from the temporary set of one or more visualization states to the second set of one or more visualization states. As shown in FIG. 7E, in some implementations, the one or more transitional rules comprise (744) a RETAIN rule for retaining each visualization state in the first set of one or more visualization states in the second set of one or more visualization states without adding any visualization state from the temporary set of one or more visualization states to the second set of one or more visualization states. As shown in FIG. 7F, in some implementations, the one or more transitional rules comprise (746) a SHIFT rule for including each visualization state in the first set of one or more visualization states in the second set of one or more visualization states and replacing one or more visualization states in the second set of one or more visualization states with visualization states in the temporary set of one or more visualization states. As shown in FIG. 7G, in some implementations, the one or more transitional rules comprise (748) a RESET rule for resetting each of the first set of one or more visualization states, the temporary set of one or more visualization states, and the second set of one or more visualization states to an empty set that includes no visualization states.

Referring now to FIG. 7M, in some implementations, the first set of one or more visualization states comprises (770) a data attribute, a transformation, a filter, or a visual encoding of a data attribute. In some implementations, the language processing module 238 determines (772) whether the first set of one or more cue phrases contains a name attribute, a value (often with synonyms), a term of measure, or a term of aggregation. In accordance with a determination that the first set of one or more cue phrases contains a name attribute or a value, but neither a term of measure nor a term of aggregation, the language processing module 238 computes (774) the first analytical intent to be the number of records corresponding to the name attribute or the value. In some implementations, the language processing module 238 determines (776) whether a data attribute is a categorical attribute with the number of distinct categories less than a threshold value. In accordance with a determination that the data attribute is a categorical attribute with the number of categories less than the threshold value, the language processing module 238 computes (778) the first analytical intent to be comparison of the categories.

In some implementations, the language processing module 238 determines (782) whether the first set of one or more cue phrases contains a term corresponding to a transformation. In accordance with a determination that the first set of one or more cue phrases contains a term corresponding to a transformation, the language processing module 238 computes (784) the first analytical intent to be either grouping or binning of a continuous variable, or computing a derived calculation. For example, the terms "group" or "bin" in the cue phrases typically indicate an intent to group or bin a continuous variable. Similarly, the cue words "rate" or "proportion" indicate a user intent to compute a derived calculation. In some implementations, the language processing module 238 determines (786) whether the first set of one or more cue phrases contains a term corresponding to a chart type, a named visual variable, or a reason for a specific type of visual encoding. In accordance with a determination that the first set of one or more cue phrases contains a term corresponding to a chart type (e.g., the cue word is "crosstab" or "heatmap"), the language processing module 238 computes (788) the first analytical intent to select a chart type for the visual encoding. In accordance with a determination that the first set of one or more cue phrases contains a term corresponding to a named visual variable (e.g., the cue words are "colored by gender" or "survival % as size"), the language processing module 238 computes (790) the first analytical intent to select a type of encoding for a visual variable. In accordance with a determination that the first set of one or more cue phrases contains a reason for a specific type of visual encoding, the language processing module 238 computes (792) the first analytical intent to select a corresponding visual encoding. For example, the cue words 'correlation', 'distribution', 'extremes' refer to targets, cue words 'compare', 'summarize', or 'identify' mean actions. Some implementations employ visual encoding heuristics if the user intent is implicit.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for visual analysis of a dataset, comprising:
at a computer having a display, one or more processors, and memory storing one or more programs configured for execution by the one or more processors:
displaying a data visualization based on a first dataset retrieved from a database using a first set of one or more queries;
computing an initial visualization state that includes a plurality of elements corresponding to data attributes of the data visualization;
receiving a user input to specify a natural language command related to the data visualization;
extracting a first set of one or more cue phrases from the natural language command;
determining that a first data attribute is a categorical attribute having a number of categories less than a threshold value;
determining a transitional goal, to transform the data visualization to compare the categories, based on the first set of one or more cue phrases and the determination that the first data attribute is a categorical attribute having a number of distinct categories less than the threshold value;
deriving an updated visualization state based on the transitional goal, by applying one or more transitional rules to each element of the initial visualization state;
computing a set of one or more analytical functions associated with the updated visualization state, thereby creating a set of one or more functional phrases; and
updating the data visualization based on the set of one or more functional phrases.

2. The method of claim 1, wherein the initial visualization state and the updated visualization state consist of (i) the data attributes, (ii) transformations to generate derived attributes from the data attributes, (iii) filters for the data attributes, and (iv) visual encodings for the data attributes.

3. The method of claim 1, wherein the one or more transitional rules maintain conversational coherence between the initial visualization state to the updated visualization state.

4. The method of claim 1, further comprising:
determining if the first set of one or more cue phrases contains a name attribute, a value, a term of measure, and/or a term of aggregation; and
in accordance with a determination that the first set of one or more cue phrases contains a name attribute or a value, but neither a term of measure nor a term of aggregation, determining an additional transitional goal to be calculating a count of records corresponding to the name attribute or the value.

5. The method of claim 1, further comprising:
determining if the first set of one or more cue phrases contains a term corresponding to a transformation; and
in accordance with a determination that the first set of one or more cue phrases contains a term corresponding to a transformation, determining an additional transitional goal to be either grouping or binning of a continuous variable, or computing a derived calculation.

6. The method of claim 1, further comprising:
determining if the first set of one or more cue phrases contains a term corresponding to a chart type or a named visual variable;
in accordance with a determination that the first set of one or more cue phrases contains a term corresponding to a chart type, determining an additional transitional goal to be selecting the chart type; and
in accordance with a determination that the first set of one or more cue phrases contains a term corresponding to a named visual variable, determining an additional transitional goal to be encoding for the named visual variable according to the one or more cue phrases.

7. The method of claim 1, wherein the one or more transitional rules comprise a CONTINUE rule for including each element of the initial visualization state in the updated visualization state and adding one or more new elements based on the first set of one or more cue phrases.

8. The method of claim 1, wherein the one or more transitional rules comprise a RETAIN rule for retaining each element of the initial visualization state in the updated visualization state without adding any element based on the first set of one or more cue phrases.

9. The method of claim 1, wherein the one or more transitional rules comprise a SHIFT rule for including each element of the initial visualization state in the updated visualization state and replacing one or more elements in the updated visualization state based on the first set of one or more cue phrases.

10. The method of claim 1, wherein the one or more transitional rules comprise a RESET rule for setting each element of the updated visualization state to an empty set.

11. The method of claim 1, further comprising:
determining if the first set of one or more cue phrases contains terms that signify elaboration; and
in accordance with a determination that the first set of one or more cue phrases contains terms that signify elaboration, determining an additional transitional goal to elaborate.

12. The method of claim 1, further comprising:
determining if the first set of one or more cue phrases contains terms that signify adjust/pivot; and
in accordance with a determination that the first set of one or more cue phrases contains terms that signify adjust/pivot, determining an additional transitional goal to adjust/pivot.

13. The method of claim 1, further comprising:
determining if the first set of one or more cue phrases contains terms that signify undoing, or a repetition of an utterance that generated a desired visualization state; and
in accordance with a determination that the first set of one or more cue phrases contains terms that signify undoing, determining an additional transitional goal to undo.

14. The method of claim 1, further comprising:
- determining if the first set of one or more cue phrases contains terms that signify starting anew, or corresponds to an explicit reset; and
- in accordance with a determination that the first set of one or more cue phrases contains terms that signify starting anew, determining an additional transitional goal to start anew.

15. The method of claim 1, further comprising:
- determining if the first set of one or more cue phrases contains terms that signify retry; and
- in accordance with a determination that the first set of one or more cue phrases contains terms that signify retry, determining an additional transitional goal to retry.

16. The method of claim 1, wherein (i) elaboration implies adding new information to the data visualization, (ii) adjustment implies adapting one or more aspects of the data visualization, (iii) retrying implies re-attempting a previous step that failed, and (iv) undoing implies reverting the data visualization to a previous state.

17. An electronic device, comprising:
- a display;
- one or more processors;
- memory; and
- one or more programs, wherein the one or more programs are stored in the memory and are configured to be executed by the one or more processors, the one or more programs including instructions for:
  - displaying a data visualization based on a first dataset retrieved from a database using a first set of one or more queries;
  - computing an initial visualization state that includes a plurality of elements corresponding to data attributes of the data visualization;
  - receiving a user input to specify a natural language command related to the data visualization;
  - extracting a first set of one or more cue phrases from the natural language command;
  - determining that a first data attribute is a categorical attribute having a number of categories less than a threshold value;
  - determining a transitional goal, to transform the data visualization to compare the categories, based on the first set of one or more cue phrases and the determination that the first data attribute is a categorical attribute having a number of distinct categories less than the threshold value;
  - deriving an updated visualization state based on the transitional goal, by applying one or more transitional rules to each element of the initial visualization state;
  - computing a set of one or more analytical functions associated with the updated visualization state, thereby creating a set of one or more functional phrases; and
  - updating the data visualization based on the set of one or more functional phrases.

18. A non-transitory computer readable storage medium storing one or more programs configured for execution by an electronic device with a display, the one or more programs comprising instructions for:
- displaying a data visualization based on a first dataset retrieved from a database using a first set of one or more queries;
- computing an initial visualization state that includes a plurality of elements corresponding to data attributes of the data visualization;
- receiving a user input to specify a natural language command related to the data visualization;
- extracting a first set of one or more cue phrases from the natural language command;
- determining that a first data attribute is a categorical attribute having a number of categories less than a threshold value;
- determining a transitional goal, to transform the data visualization to compare the categories, based on the first set of one or more cue phrases and the determination that the first data attribute is a categorical attribute having a number of distinct categories less than the threshold value;
- deriving an updated visualization state based on the transitional goal, by applying one or more transitional rules to each element of the initial visualization state;
- computing a set of one or more analytical functions associated with the updated visualization state, thereby creating a set of one or more functional phrases; and
- updating the data visualization based on the set of one or more functional phrases.

* * * * *